United States Patent [19]
Kolpatzik et al.

[11] Patent Number: 5,745,660
[45] Date of Patent: Apr. 28, 1998

[54] IMAGE RENDERING SYSTEM AND METHOD FOR GENERATING STOCHASTIC THRESHOLD ARRAYS FOR USE THEREWITH

[75] Inventors: Bernd W. Kolpatzik; Jay E. Thornton, both of Watertown, Mass.

[73] Assignee: Polaroid Corporation, Cambridge, Mass.

[21] Appl. No.: 427,880

[22] Filed: Apr. 26, 1995

[51] Int. Cl.$^6$ .......................... G06F 15/00; H04N 1/40; H04N 1/41; G06K 9/38
[52] U.S. Cl. ............... 395/108; 358/457; 358/456; 358/465; 358/429; 358/455; 358/458; 358/459; 358/466; 382/270; 382/272
[58] Field of Search .............. 395/108; 358/456, 358/457, 465, 429, 448, 455, 458, 459, 466; 382/270, 272

[56] References Cited

U.S. PATENT DOCUMENTS

| | | | |
|---|---|---|---|
| 5,111,310 | 5/1992 | Parker et al. | 358/456 |
| 5,214,517 | 5/1993 | Sullivan et al. | 358/456 |

OTHER PUBLICATIONS

P. Jones, Evolution of halftoning technology in the United States patent literature, *J. Electronic Imaging*, vol. 3(3), Jul. 1994, pp. 257–275.

T. Mitsa, K. Parker, Digital halftoning technique using a blue–noise mask, *J. OptSoc.Am.A*, vol. 9, No. 11, Nov. 1992, pp. 1920–1929.

M. Yao, K. Parker, Modified approach to the construction of a blue noise mask, *J. Electronic Imaging*, Jan. 1994, vol. 3(1), pp. 92–97.

R. Ulichney, The void-and-cluster method for dither array generation, *IS&T/SPIE Symposium on Electronic Imaging Science & Tech.*, San Jose, CA, Feb. 3, 1993.

M. Schulze, T. Pappas, Blue noise and model–based halftoning, *Proc. SPIE Human Vision, Visual Processing and Digital Display V*, San Jose, CA, Feb. 1994, pp. 182–194.

J. Hamilton, Diamond screening in theory and practice, *IS&T's Third Technical Symposium on Prepress, Proffing & Printing*, 1993, pp. 113–116.

Z. Xie, M. Rodriguez, A bandwidth preservation approach to stochastic screening, *IS&T's Third Technical Symposium on Prepress, Proofing & Printing*, 1993, pp. 110–112.

Harlequin shows new FM screens, *Seybold Special Report*, vol. 3, No. 2, p. 39.

Research Disclosure, No. 345, Jan. 1993, Kenneth Mason Publications, England.

*Primary Examiner*—Edward L. Coles, Sr.
*Assistant Examiner*—Tia M. Harris
*Attorney, Agent, or Firm*—Robert A. Sabourin

[57] ABSTRACT

An image rendering system, for generating discrete tone image data representing a continuous-tone image for rendering by a rendering device, the image rendering system includes a stochastic threshold array generating arrangement and an image data processing section. The stochastic threshold array generating arrangement generates a plurality of stochastic threshold arrays from a random seed pattern that have been subsequently optimized to reduce image artifacts in the rendering of tones. Each pattern is optimized to reflect (i) a selected trade-off between grain and possible mottle in the rendered image, (ii) distortions introduced by the rendering device in rendering an image defined by the pattern and an observer in viewing the image, and (iii) boundary effects so that the patterns, when tiled together, have optimal visual characteristics proximate their respective edges. The image data processing section processes the continuous tone image data in relation to the stochastic threshold arrays generated by the stochastic threshold array generating arrangement. The image data processing section may be used to either randomly tile, or tile in an ordered way, the stochastic threshold arrays over the continuous-tone image data and generates the discrete tone image data in response to correspondingly positioned pixels of the continuous-tone image data and threshold values of the stochastic threshold arrays.

64 Claims, 16 Drawing Sheets

IMAGE RENDERING SYSTEM AND METHOD FOR GENERATING STOCHASTIC THRESHOLD ARRAYS FOR USE THEREWITH

FIELD OF THE INVENTION

The invention relates generally to the field of processing and rendering of digital images and more particularly to systems and methods for generating stochastic threshold arrays for use in generating discrete-tone image data, such as halftone image data, in response to continuous-tone image data.

BACKGROUND OF THE INVENTION

Several techniques have been developed for rendering of continuous-tone images, represented by image data in which values of picture elements ("pixels") may take on values between, for example, black and white, using discrete-tone media or display devices in which rendered pixels may take on only two or a few pixel values, such as black and white. Generally, the techniques attempt to generate, for various regions of the continuous-tone images representing, for example, a particular shade of gray (that is, a "tone"), a combination of black and white pixels in the rendered image which, to the eye, appears to have the corresponding shade of gray. For example, a region of the continuous-tone image which is fifty-percent gray, or half-way between black and white, would be represented by a discrete-tone region in which one-half of the pixels would be white, and the other half would be black. For a color image, each color is generally processed separately, so that pixel values representing the intensity of, for example, red, green and blue ("RGB"), cyan, magenta, and yellow ("CMY"), or cyan, magenta, yellow and black ("CMYK") for the pixels in an image would be generated independently.

In one rendering technique, termed "error diffusion," the continuous-tone image data is processed pixel by pixel, and discrete-tone pixel data is generated for each pixel. Error diffusion systems generally process the image data by scanning across successive lines in the image, generally starting from, for example, the upper left-hand corner of the image. In generating pixel data for the first pixel, an error diffusion system will generate a discrete-tone pixel value in response to the continuous tone pixel value for the pixel based on a selected threshold value. If, for example, the continuous-tone pixel value is represented by numerical values between zero (representing black) and two hundred and fifty five (representing white), the discrete tone pixel value (either zero for black or two hundred and fifty five for white) will be determined based on whether it is above or below the threshold value, which will generally be selected to be half way through the range of values that the continuous tone pixel data may take on. In generating a value for the second pixel, the error diffusion system will also generate a discrete-tone pixel value in response to threshold value, but instead of only using the pixel's continuous-tone pixel value, it will generate an adjusted continuous-tone pixel value corresponding to the sum of its continuous-tone pixel value and the difference between the discrete-tone pixel value generated for the first pixel and the first pixel's continuous tone pixel value (that is, the "error"), the error being weighted according to a selected weighting function. The result is then compared to the threshold value and a discrete-tone pixel value generated in response. This operation is repeated for each pixel, across the first line, and across each pixels of successive lines, with an error-adjusted continuous tone pixel value being generated for each pixel using the errors generated for previously-processed pixels taken in relation to a weighting function. The point of this technique is that the errors, which, generally speaking relate to the difference between the luminance represented by the discrete-tone image data and the continuous-tone image data for correspondingly-positioned pixels, are diffused throughout the discrete-tone image from the upper left-hand corner of the image toward the right and downwardly through the image, with the degree of diffusion being related to the selected weighting function. Thus, while the luminance represented by the discrete-tone pixel value for any particular pixel may be considerably different from the continuous-tone pixel level for a given pixel, over a group of pixels the errors tend to even out so that the discrete-tone image is perceptually similar to the continuous-tone image.

While the error diffusion technique produces generally accurate pleasing rendered images, it will be appreciated that a considerable amount of processing is required to generate discrete-tone image data for an image. To reduce the amount of processing required, another technique, termed a "stochastic screen" technique, has been developed. In a system which operates in accordance with the stochastic screen technique, a stochastic threshold array is generated which has array elements organized in a selected number of rows and columns. Each array element of the stochastic threshold array is a threshold value. In generating the discrete-tone image values, the stochastic threshold array is essentially tiled over the continuous-tone pixel values, and the discrete-tone pixel values are generated in response to a comparison between continuous-tone pixel values for the pixels and threshold values of correspondingly-positioned stochastic threshold array elements. The stochastic threshold array is generated from an optimized pattern, which in turn is generated from a seed pattern that comprises an array in which the various array elements are initially randomly assigned binary values. The seed pattern is processed to provide for selected distribution characteristics, and the stochastic threshold array generated after the distribution characteristics have been achieved. Typically, the optimized patterns and associated stochastic threshold arrays can be generated in advance of processing of the image data, since they normally do not depend on the continuous-tone image data for a particular image. Since the continuous-tone pixel values for the continuous tone image are compared, pixel for array element, with the array elements of the tiled stochastic threshold array, and do not depend on processing in connection with neighboring pixels, the processing of the pixels can take place in parallel, which can speed up processing of the image as a whole.

While systems operating in accordance with error diffusion techniques and stochastic screening techniques can generally generate pleasing discrete-tone images, they can have several problems. The primary problem is that they tend to produce undesirable artifacts, such as directional structures, in the discrete-tone image which are not present in the continuous-tone image. Particularly in connection with error diffusion systems, these artifacts are usually present in portions of an image which have constant or slowly-varying luminance. In stochastic screen systems, the artifacts may tend to appear as regular structures that correspond to the locations at which the edges of the tiled stochastic threshold arrays were tiled over the image. In addition, particularly in connection with error diffusion systems, the systems tend to sharpen abrupt edges in an undesirable unidirectional way.

There are several other problems which can arise particularly in connection with rendered images that are generated using systems operating in accordance with stochastic screening techniques. Generally, in rendering a discrete-tone image in which there are, for example, two discrete-tone pixel values, each pixel will be rendered either by generating a dot or no dot, depending on its discrete-tone pixel value, on a recording medium. If the threshold values in the stochastic threshold arrays used in such systems are distributed so that clusters of relatively large aggregations of dots of any discrete-tone value will be generated, particularly for regions in an image having constant or slowly-varying luminance, then it is that the discrete-tone image will be relatively grainy, since such aggregations of uniformly-valued pixels may be visually perceptible.

On the other hand, if the threshold values are distributed to minimize graininess, by increasing the likelihood that individual or at most small aggregations of dots will be generated, then the discrete-tone image may exhibit an undesirable effect termed herein "mottle." Particularly for regions of a continuous-tone image having constant or almost-constant luminance, mottle is manifested as low-frequency variation of density over a region of a rendered image which is intended to be uniform. This can arise, for example, from variations in the process in which the discrete-tone image is rendered, resulting in variations in the sizes of the dots rendered on different portions of the medium. Changes in the proportion of the rendering medium covered by dots to that not covered by dots, in different regions of an image for which the luminance should be constant, can effectively change the luminance of the region as perceived by an observer. Significant variations in the sizes of dots can, for individual and small aggregations of dots of a discrete-tone image, operate to vary the luminance as perceived by the eye, since a significant variations in dot size for a number of dispersed dots as among different portions of a region can significantly change the relative proportion of the medium that is covered by dots to the amount that is not covered by dots as among those sections. This will be manifested as mottle.

While variations in dot size will also occur for relatively large clusters of dots, since the dots in such clusters would overlap, only the variations in dot size for the dots on the periphery of the clusters would result in changes in the cluster size, and so the change of the proportion of the medium covered by dots to the proportion not covered by dots would not be significant. Accordingly, providing stochastic threshold arrays for which dots are likely to be clustered in relatively large aggregations may tend to reduce mottle, but, as noted above, they can increase the likelihood of grain in the rendered image.

SUMMARY OF THE INVENTION

The invention provides a new and improved image rendering system, including a new system and method for generating stochastic threshold arrays for use in rendering images.

In brief summary, in one aspect the invention provides an image rendering system for generating discrete tone image data in response to continuous-tone image data for rendering by a rendering device. The image rendering system includes a stochastic threshold array library and an image data processing section. The stochastic threshold array library stores a plurality of stochastic threshold arrays, each stochastic threshold array being generated in response to an individually-generated optimized pattern, each optimized pattern being optimized to reflect a predetermined grain/mottle trade-off condition and further being optimized so that each stochastic screen, when tiled with itself will have optimal visual tiling characteristics. The image data processing section processes the continuous tone image data in relation to stochastic threshold arrays obtained from the library. The image data processing section retrieves the stochastic threshold array for one of the predetermined grain/mottle trade-off conditions from said stochastic threshold array stores, tiles the retrieved stochastic threshold array over the continuous-tone image data and generates the discrete tone image data in response to correspondingly positioned pixels of the continuous-tone image data and threshold values of the tiled stochastic threshold array.

In accordance with another aspect, the invention provides an image rendering system for generating discrete tone image data in response to continuous-tone image data for rendering by a rendering device, the image rendering system comprising a stochastic threshold array library and an image data processing section. The library includes a plurality of stochastic threshold arrays, each generated in response to an individually-generated optimized pattern, the optimized patterns being optimized so that they have optimal visual tiling when tiled together. The image data processing section processes the continuous tone image data in relation to stochastic threshold arrays. The image data processing section randomly retrieves the stochastic threshold arrays, tiles the retrieved stochastic threshold arrays randomly over the continuous-tone image data and generates the discrete tone image data in response to correspondingly positioned pixels of the continuous-tone image data and threshold values of the tiled stochastic threshold arrays.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
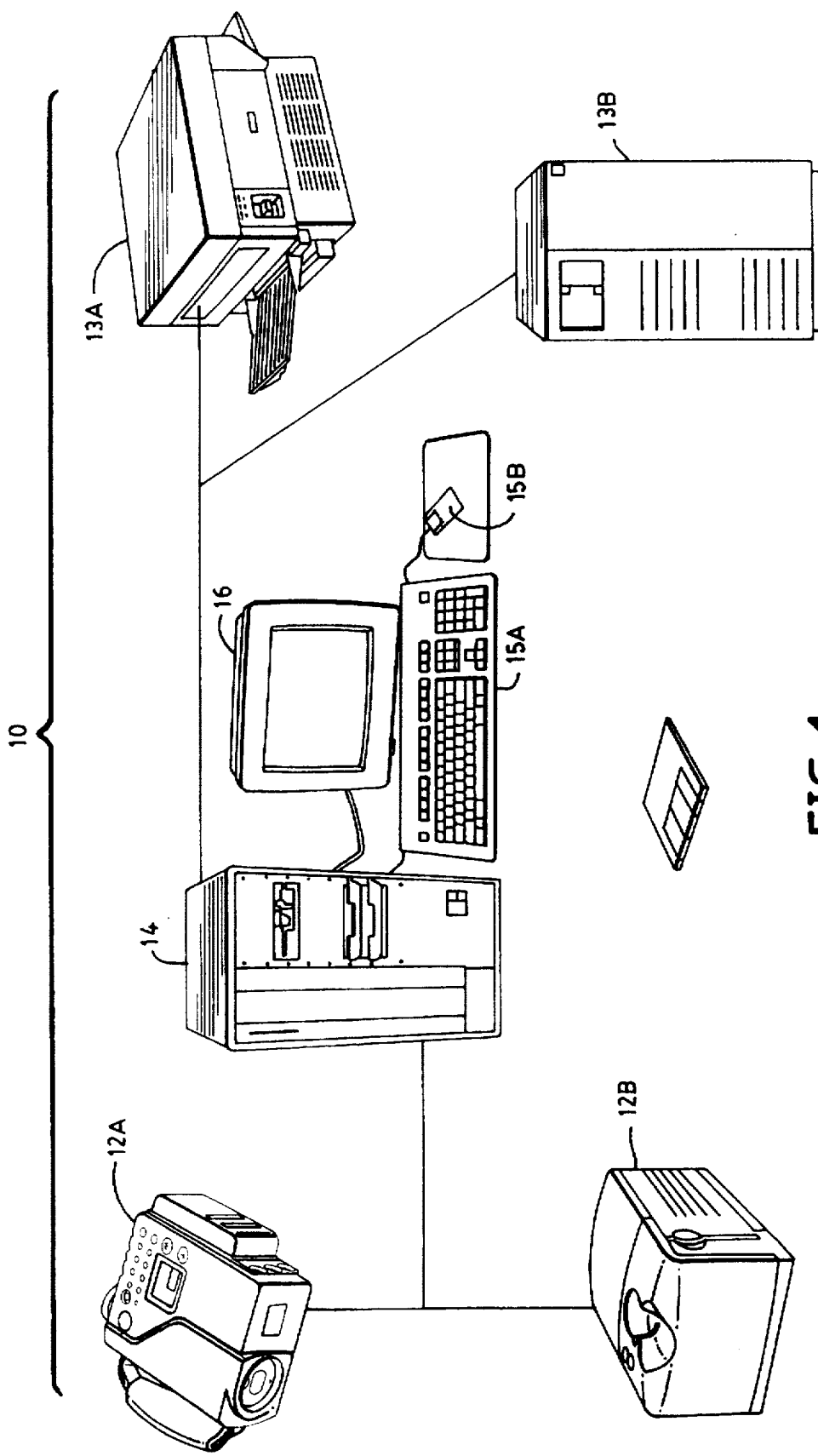
FIG. 1 is an illustrative computer system including an image rendering system constructed in accordance with the invention.

FIG. 1 is diagram of a computer system 10 including an image rendering system 20 (FIG. 2) constructed in accordance with the invention. With reference to FIG. 1, the computer system 10 in one embodiment includes a computer 11, one or more image acquisition devices represented by a camera 12A and a thirty-five millimeter slide scanner 12B (generally identified by reference numeral 12), for acquiring an image and converting it to continuous-tone digital image data, and one or more image rendering devices represented by a printer 13A and a raster image processor 13B (generally identified by reference numeral 13) for generating an output image. The computer 10, which in one embodiment is a general-purpose stored-program digital computer which comprises the image rendering system 20, receives the continuous-tone digital image data, and processes it in relation to stochastic threshold arrays as described below in connection with FIGS. 2 through 9E to generate discrete-tone digital image data to be rendered by, for example, an image rendering device 13.

As is conventional, the computer 10 includes a processor module 14 and operator interface elements comprising operator input components such as a keyboard 15A and/or a mouse 15B (generally identified by reference numeral 15) and operator output elements such as a video display device 16. The processor module 14 includes, for example, processor, memory and mass storage devices such as disk and/or tape storage elements (not separately shown) which perform processing and storage operations in connection with digital data provided thereto. When operating in accordance with the image rendering system 20, the computer system 10 will generally be processing certain programs which enable it to perform selected operations as described below in connection with FIGS. 2 through 9E. The operator input elements 15 are provided to permit an operator to input information for processing, including information for controlling the image processing operations. The video display device 16 is provided to display output information to the operator, such as information identifying certain selections the operator may make in connection with the processing of the image data. Although the computer system 10 is shown as comprising particular components, such as the keyboard and mouse for receiving input information from an operator, and a video display device for displaying output information to the operator, it will be appreciated that the computer system 10 may include a variety of components in addition to or instead of those depicted in FIG. 1.

Although the computer system 10 in one embodiment has been depicted as receiving continuous-tone image data from particular types of image acquisition devices 12, such as the camera 12A and a thirty-five millimeter scanner 12B, and particular types of image rendering devices 13, such as a printer 13A and a raster image processor 13B, it will be appreciated that numerous other types of image acquisition devices 12 and image rendering devices 13 may be used in connection with the computer system 10.

Although one embodiment of the image processing system 20 has been indicated as comprising elements of a general-purpose stored-program computer system 10, it will be apparent to those skilled in the art that the image processing system 20 may alternatively include special-purpose hardware and/or program components, or a combination of a computer system 10 with special-purpose hardware and/or program components.

Figure 2:
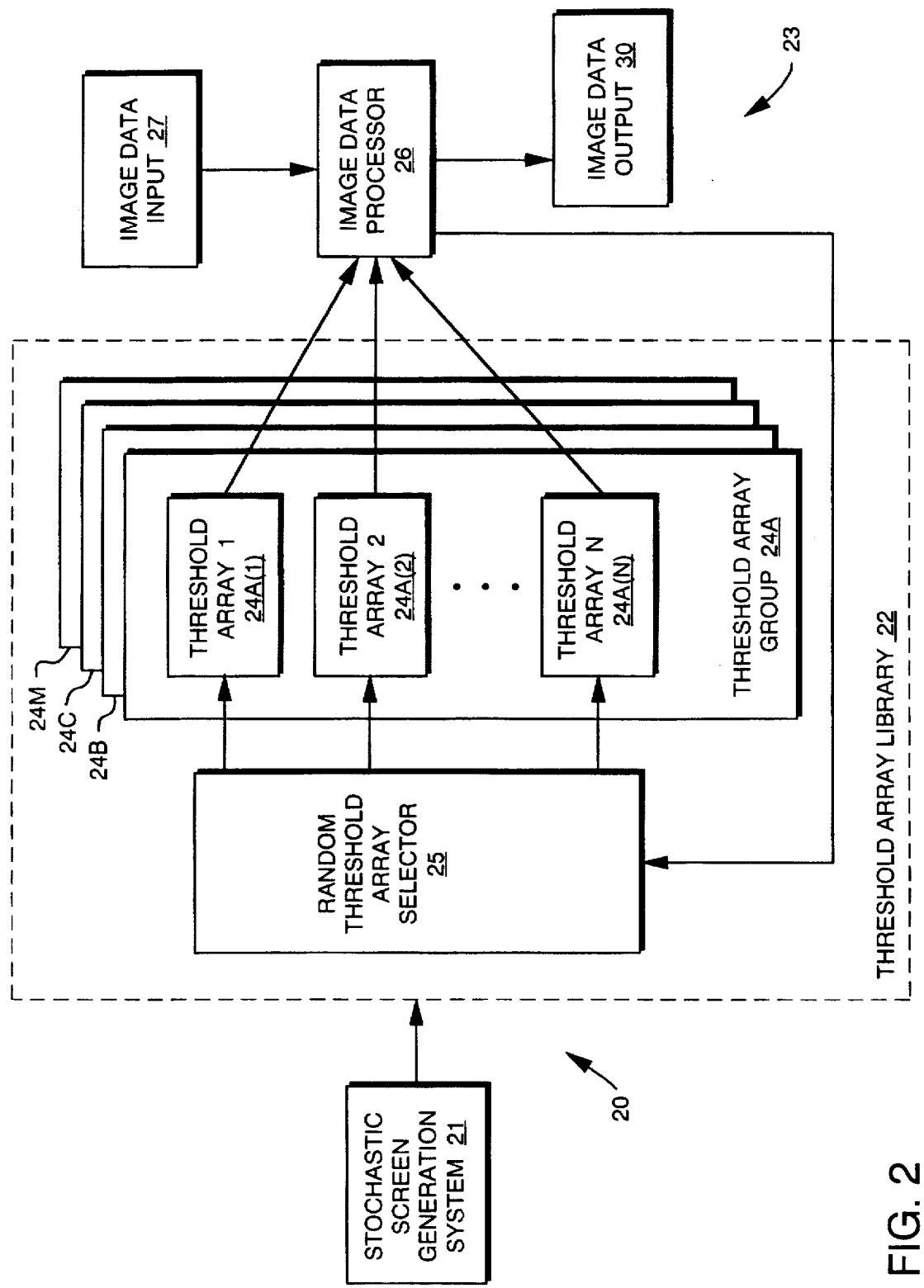
FIG. 2 is a functional block diagram of an image rendering system constructed in accordance with the invention.

FIG. 2 is a functional block diagram of an image rendering system 20 constructed in accordance with the invention.

With reference to FIG. 2, the image rendering system 20 comprises a stochastic threshold array generation system 21, a stochastic threshold array library 22, and an image processing subsystem 23 which cooperate to receive input image data and generate in response thereto output image data. Generally, for a two-dimensional image, the image will be represented as a two-dimensional array of picture elements, or "pixels," arranged in a number of rows and columns, and a input image data value is provided for each pixel. It will be appreciated that the number of rows and columns of a input image data matrix will depend on the height and width of the image and the resolution, that is, the number of pixels per unit of distance along the height and width of the image.

For a gray-scale image, the input image data for each pixel comprises a value corresponding to the intensity of the pixel. For a color image, the continuous tone image data for each pixel will have a value for each of the primary colors in which the image is encoded. In either case, the input image data is generally constrained to have values within a selected range, such as between zero and two hundred and fifty five, which can be quantized to an eight-bit digital data word. The image processing subsystem 23, in response to the input image data array, generates an output image data array having a plurality of array elements each corresponding to a array element of the input image data array, with each output image data array element containing a output image data value generated in response to the correspondingly-positioned element of the input image data array, but which is constrained to have two or only a few colorant density values which can be rendered by a rendering device.

The stochastic threshold array generation system 21, which is described in more detail below in connection with FIGS. 3 through 9E, generates a plurality of optimized patterns and, using each optimized pattern so generated, generates a stochastic threshold array which it provides to the stochastic threshold array library 22. Each stochastic threshold array is essentially a matrix having matrix elements arrayed in a predetermined number of rows and columns, with each matrix element comprising a threshold value. In generating the output image data, the threshold values are compared to values of the input image data and output image data values are generated in response to the comparison. The stochastic threshold array generation system 21 generates a number of sets of stochastic threshold arrays, each set providing a particular trade-off between grain and mottle, as described above. The threshold arrays are generally generated such that the threshold values are distributed so as to provide a discrete-tone image when rendered by a rendering device 13 which locally maintains the average gray value of the input image and which is perceptually similar to the continuous-tone image.

The stochastic threshold array library 22 includes a plurality of stochastic threshold array groups 24A through 24M (generally identified by reference numeral 24m) each of which includes a plurality of threshold array stores 24m(1) through 24m(N) (generally identified by reference numeral 24m(n)). Each stochastic threshold array group 24m stores a set of threshold arrays generated by the stochastic threshold array generation system 21, so that the threshold arrays stored in each stochastic threshold array group will be associated with a particular trade-off grain and mottle. Within each stochastic threshold array group 24m, each threshold array store 24m(n), in turn, stores one of the stochastic threshold arrays generated by the stochastic threshold array generation system 21 for the group's grain/mottle trade-off.

The stochastic threshold array library 22 further includes a random stochastic threshold array selector 25. The random stochastic threshold array selector 25 essentially manages stochastic threshold array groups 24m and stores 24m(n), enables the arrays generated by the stochastic threshold array generation system 21 to be stored in the various stores 24m(n) for the appropriate grain/mottle trade-off, and enables the stochastic threshold arrays stored in the stores 24m(n) to be provided to the image processing subsystem 23 for use in processing of the input image data.

The image processing subsystem 23 includes an image data processor 26, which receives the input image data for an image from an image data input 27 and, using stochastic threshold arrays it obtains from the stochastic threshold array library 22, generates output image data which it supplies to an image data output 30. In generating the output image data from the input image data provided by input 27, the image data processor 26 identifies to the random threshold array selector 25 a particular desired grain/mottle trade-off, effectively identifying one of the stochastic threshold array groups 24m, and enables the random stochastic threshold array selector 25 to provide it with stochastic threshold arrays from the stores 24m(n) from the identified group 24m on a random basis. The image data processor 26 will generate the output image data by randomly tiling the stochastic threshold arrays provided by the threshold array library 22 over the input image data, such that each matrix element of the randomly-tiled stochastic threshold arrays is associated with a pixel of the continuous-tone image, and processes the input image data in relation to correspondingly-positioned stochastic threshold array elements to generate the output image data. In the case of a binary process, the image data processor performs an element-by-element comparison of the continuous-tone pixel value with the stochastic threshold array element value and generates the output image data for corresponding pixels of the discrete-tone image in response to the comparison. Since the image data processor 26 uses a number of randomly selected and tiled stochastic threshold arrays in generating the output image data, the output image data will be generally free of visual artifacts which are present in output image data generated by image processing systems using conventional error diffusion or stochastic screening techniques.

Figure 3:
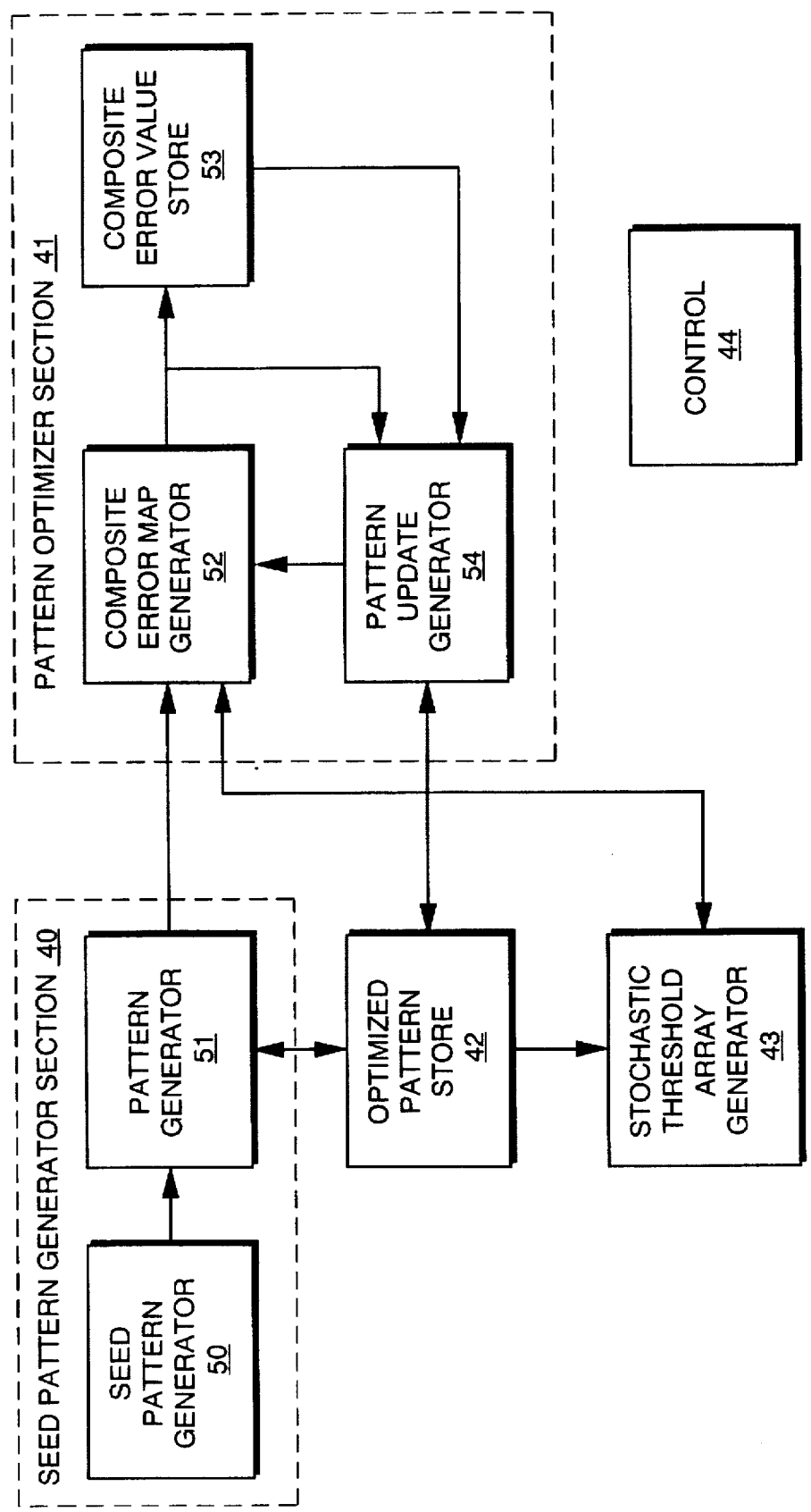
FIG. 3 is a functional block diagram of a stochastic threshold array generating system used in the image rendering system depicted in FIG. 2.
Figure 4:
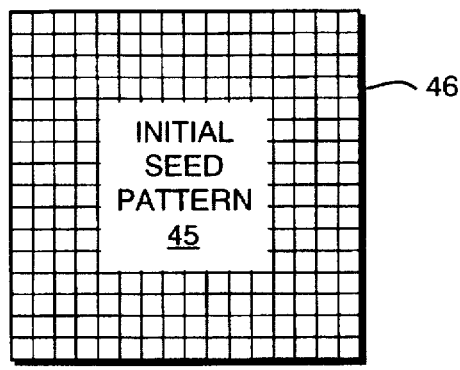
FIGS. 4 and 5 are diagrams illustrating stochastic patterns which are useful in connection with an understanding of the operation of the stochastic threshold array generating system depicted in FIG. 3.
Figure 5:
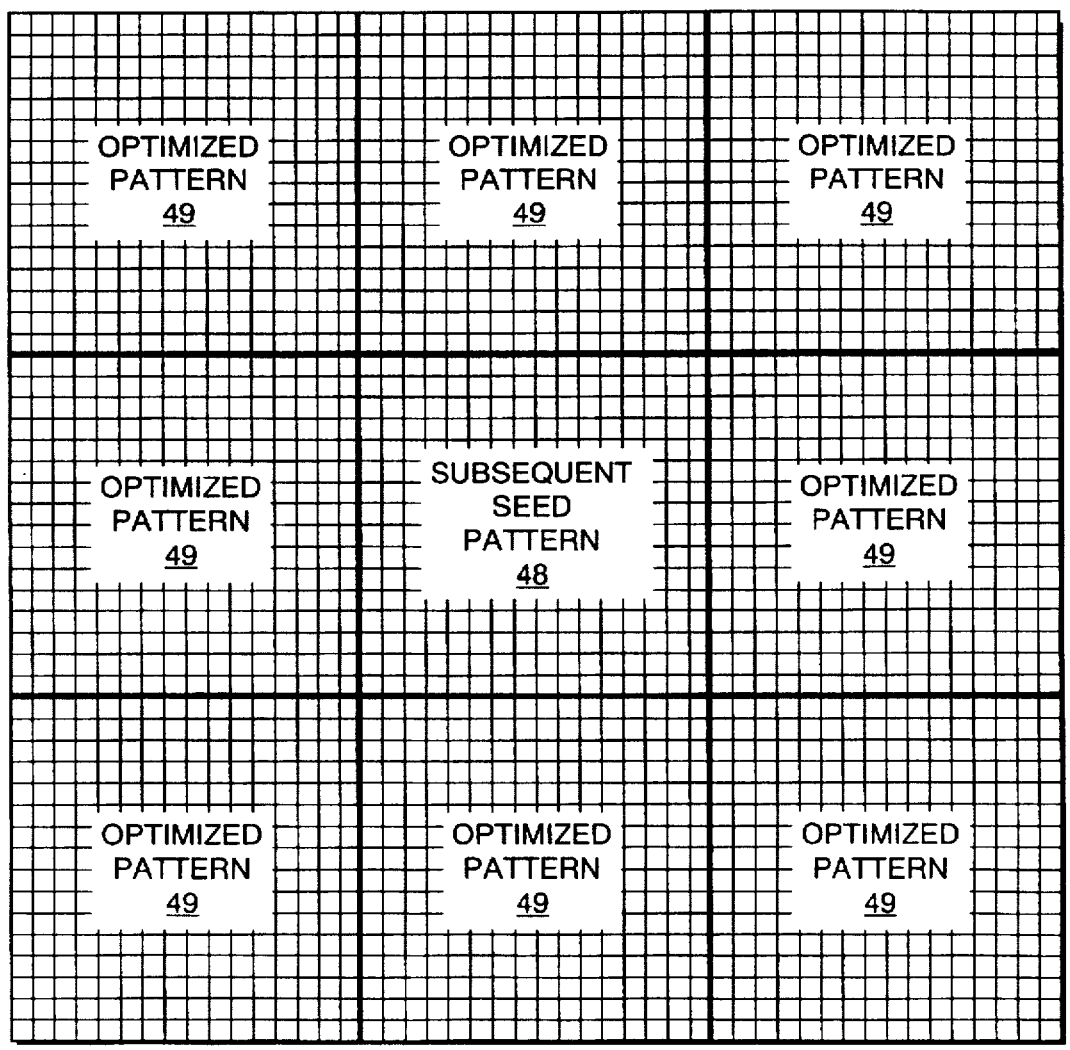
Figure 6:
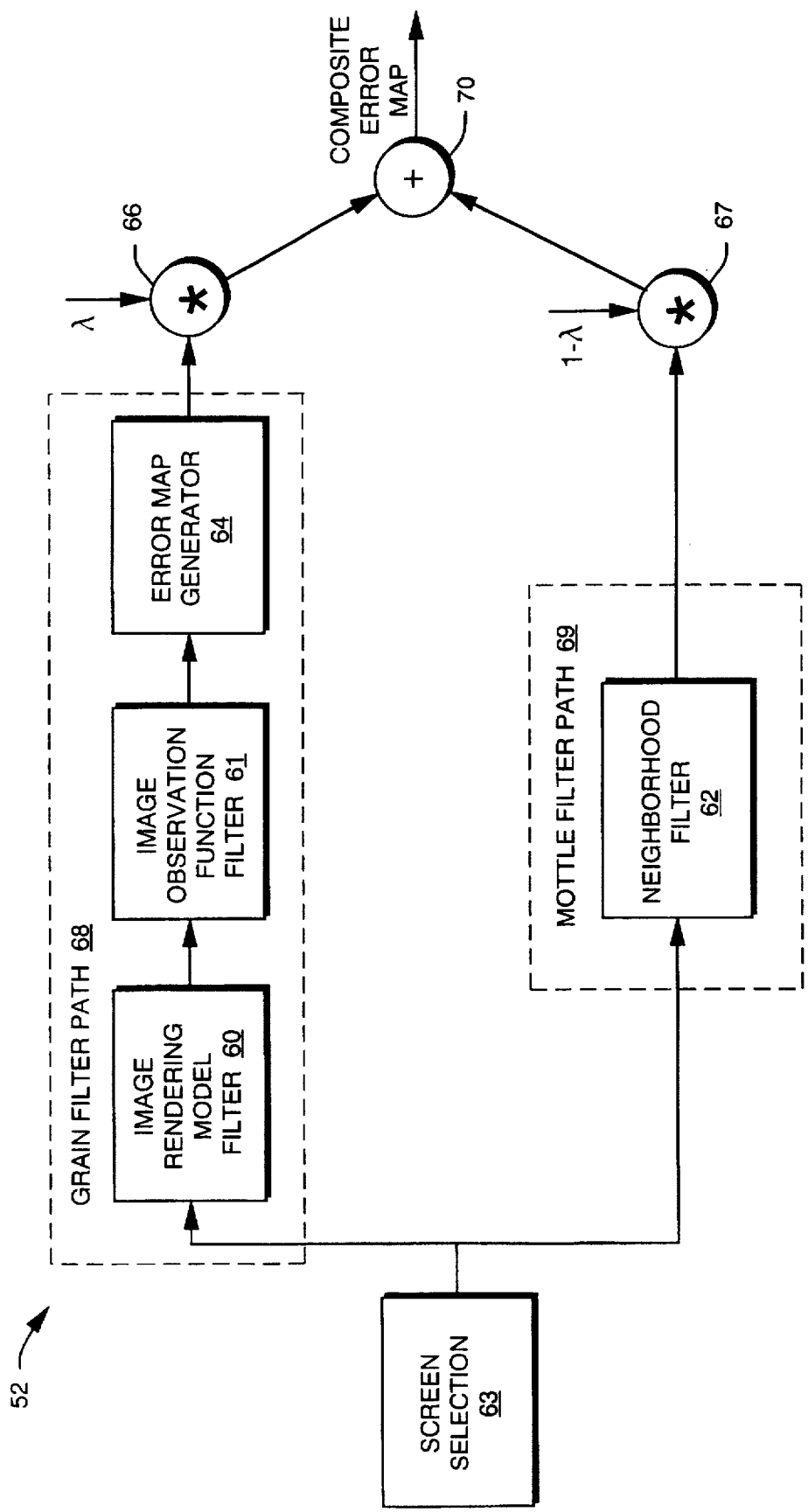
FIG. 6 is a functional block diagram of a composite error map generator used in the stochastic threshold array generating system depicted in FIG. 3

As described above, the stochastic threshold array generating system 21 generates a number of stochastic threshold arrays to be used by the image processing subsystem 23 in generating output image data in response to the input image data provided thereto. The structure and operation of the stochastic threshold array generating system 21 will be described in connection with FIGS. 3 through 9E. FIGS. 3 and 6 comprise functional block diagrams of, respectively, the stochastic threshold array generating system used in the image rendering system 21 and a portion thereof, namely, a composite error map generator. FIGS. 4 and 5 illustrate patterns which are generated and used by the stochastic threshold array generating system 21. FIGS. 7 through 9E comprise flow-charts illustrating the operations performed by the stochastic threshold array generating system 21 in generating the stochastic threshold arrays for storage in the stochastic threshold array library 22.

With reference initially to FIG. 3, the stochastic threshold array generating system 21 generally includes a seed pattern generator section 40, a pattern optimizing section 41, an optimized pattern store 42 and a stochastic threshold array generator 43 all under control of a control element 44. The control 44 enables the seed pattern generator section 40, the pattern optimizing section 41, the optimized pattern store 42 and a stochastic threshold array generator 43 to operate in a series of iterations, in each iteration generating one optimized pattern and a corresponding stochastic threshold array. Generally, the seed pattern generator section 40, under control of the control element 44, generates seed patterns each in the form of an array including a plurality of array elements each having one of two values, which are referred to herein as "black" and "white." It will be appreciated that the stochastic threshold array generating system 21 may represent the array element values by, for example, numerical values "zero" and "two hundred and fifty-five" respectively, corresponding to the ends of the range of values which the input image data may take on, or by any other convenient representation.

The seed pattern generator section 40 will generate the seed pattern with randomly-assigned black and white pattern elements to achieve a predetermined gray level. The gray level of the seed pattern corresponds to the ratio of the number of white elements to the total number of elements, so that a seed pattern which has a fifty-percent gray characteristic will have one-half of the elements with the white value and the other half with the black value. It should be noted that the seed pattern generator section 40 generates the seed pattern such that the white and black array elements are randomly assigned throughout the pattern, and so there may be clusters of black elements and clusters of white elements throughout the pattern.

For the first iteration, the seed pattern generator section 40 will generate a initial seed pattern represented by a pattern 45 as shown in FIG. 4. With reference to FIG. 4, the initial seed pattern 45 comprises a number of elements, generally identified by reference numeral 46, organized in the same number of rows and columns as a stochastic threshold array to be generated by the stochastic threshold array generation system 21. As noted above, each element 46 may have either the white value or the black value, with the white and black elements being randomly assigned in the initial seed pattern 45, with the number of elements having white or black values being determined by the gray level chosen for the seed pattern, which in one embodiment is arbitrarily chosen to be fifty percent.

For each seed pattern after the first iteration, the pattern generator section 40 generates a composite seed pattern, identified by reference numeral 47 in FIG. 5, as the pattern for use by the pattern optimizer section 41. The composite seed pattern 47 includes, as a central portion, a "subsequent iteration" seed pattern 48, which is generated in generally the same manner as the initial iteration seed pattern 45 (FIG. 4), and with the same gray level. Surrounding the subsequent iteration seed pattern 48 in the composite seed pattern 47 are optimized patterns 49 which are selected from among previously-generated optimized patterns which are stored in the optimized pattern store 42. In one embodiment, the first optimized pattern that is generated (that is, the optimized pattern that is generated in response to the initial iteration seed pattern 45 during the first iteration) is used in forming the composite seed patterns 47 for all subsequent iterations. After being processed by the pattern optimizer section 41 as described below, the central portion 48 will constitute a new optimized pattern. It has been observed that, by processing the central portion 48 and the optimized pattern 49 generated for the first iteration together, the pattern optimizer section 41 will generate optimized patterns such that stochastic threshold arrays that are generated will tile satisfactorily with each other when they are used by the image processing section 23 (FIG. 2). This tiling characteristic is enhanced in one embodiment by constraining the subsequent iteration seed patterns 48 generated by the seed pattern generator section 40 to all have the same pattern elements in their peripheries as the optimized pattern generated by the pattern optimizer section 41 during the first iteration, and by further constraining the pattern optimizer section 41 to generate optimized patterns in which the peripheral pattern elements are substantially identical.

The seed pattern generator section 40 includes a seed pattern generator 50 and a pattern generator 51 which cooperate to generate the initial seed pattern 45 or composite seed pattern 47 for each iteration. The seed pattern generator 50 generates the pattern 45 or 48 with the desired gray level as described above. For the first iteration, the pattern generator 51 passes the seed pattern 45 generated to the pattern optimizer section 41 for processing by that section 41. For each iteration after the first iteration, the pattern generator 51 will use the "subsequent iteration" seed pattern 48 as the central portion of the composite seed pattern 47, and will retrieve one or more previously-generated optimized patterns from the optimized pattern store 42 for use in generating the composite seed pattern 47.

For each pattern 45 or 47 generated by the initial seed pattern generator 40, the pattern optimizer section 41, in a series of iterations for each pattern, rearranges the black and white array elements of each pattern, to generate an optimization for the pattern having desired spatial characteristics. The pattern optimizer section 41 includes a composite error map generator 52, a composite error value store 53 and a pattern update generator 54. In generating an updated pattern for each iteration, the pattern optimizer section 41, in particular the pattern update generator 54, uses an error map generated by the composite error map generator 52, which is described in detail below in connection with FIG. 6. Generally, the composite error map generator 52, in each iteration, filters the current pattern (initially provided thereto by the pattern generator 51 or as updated by the pattern update generator 54) in accordance with filter functions that reflect (i) the distortion that is introduced in the image by a rendering device in rendering an image corresponding to the current pattern and (ii) the relative degrees of grain and possible mottle as observed by an observer in viewing such a rendered image. Based on the filtering, the composite error map generator generates the error map and a composite error value. For an image of the pattern as it would be rendered and observed, the error map indicates, for each pixel of the image, locations of grain and susceptibility to mottle, and the composite error value provides an overall indication of the measure of grain and the susceptibility to mottle for the image as a whole.

The pattern update generator 54 identifies the same number of black and white elements for which the error was the largest, and changes the identified black pixels to white and the identified white pixels to black to update the pattern. The updated pattern is again processed by the composite error map generator 52, and, if the composite error value for the updated pattern is less than the previous composite error value, the updates are retained, and otherwise they are discarded. The composite error map generator 52 and pattern update generator 54 perform these operations through a series of iterations, in each iteration retaining the updates if the composite error value of the pattern as updated during the iteration is less than the non-updated pattern. The composite error value store 53 is provided to store the composite error values between iterations. After a number of iterations, the pattern as updated is determined to be optimized and may be stored in the optimized pattern store 42 for use by the stochastic threshold array generator 43.

In processing of the first pattern as provided by the pattern generator 51, the composite error map generator 52 performs its filtering operations in accordance with a two-dimensional circular convolution methodology, or an equivalent fast Fourier transform methodology. The two-dimensional circular convolution methodology will ensure that the pattern, as finally optimized will, if tiled with itself and rendered, not have undesirable artifacts at its edges, and will further ensure that the stochastic threshold array generated therefrom will also tile with itself without boundary artifacts. For subsequent seed patterns as provided by the pattern generator 51, since the central portion 48 (which will be used in generating the new stochastic threshold array) is surrounded by previously optimized patterns 49, the composite error map generator 52 need not perform filtering in accordance with the two-dimensional circular convolution methodology; the filtering of the new pattern together with the previously-optimized patterns will ensure that the stochastic threshold array generated for the new pattern will tile with the stochastic threshold array generated for the first pattern, with reduced boundary artifacts. Since similar operations are performed for all patterns after the first, all stochastic threshold arrays will tile with the stochastic threshold array generated for the first pattern and with each other with reduced boundary artifacts. It will be appreciated that, in performing the updates for patterns after the first, the pattern update generator 54 will only perform the updates for the pixels in the central portion 48, which will be used to form the new current pattern, since the portions outside of the central portion 48 were fixed in generation of the first optimized pattern.

FIG. 6 is a functional block diagram of the composite error map generator 52 used in the stochastic threshold array generating system depicted in FIG. 3. With reference to FIG. 6, the composite error map generator 52 includes several filters, including a image rendering model filter 60, an image observation function filter 61 and a neighborhood filter 62, with the image rendering filter 60 and image observation function filter 61 comprising a "grain" filter path 68 and the neighborhood filter 62 comprising a "mottle" filter path 69.

The image rendering model filter 60 receives a current pattern, from either the seed pattern generator section 40 (during a first pattern update iteration) or the pattern update generator 54 (during subsequent pattern update iterations) as selected by a selector 63, and generates in response an array representing the effect that the image rendering device (such as a printer) would have in rendering the image in connection with a particular recording system. More specifically, in generating the "white" and "black" values for various elements of the current pattern, it can be assumed for analytical purposes, that the current pattern, if printed or otherwise rendered, would be rendered by a rendering device which has square-shaped dots. However, it will be understood by those skilled in the art that rendering devices may not have such characteristics, but instead may generate dot shapes having a variety of geometries, such as rounded dots which, when tiled with one another will completely cover the medium. The size and shape of the dot as rendered may also be effected by the particular medium; if, for example, a dot is recorded on a medium by a rendering device by exposing the medium using a laser beam which has a particular power distribution over the area over which it impinges on the medium, the size of the dot as actually recorded will be based on the power distribution characteristic and the threshold of power at which the medium will actually render the dot.

The image rendering model filter 60 generates an output which adjusts for these and similar discrepancies. The image rendering model filter 60 in one embodiment includes two elements, namely, (a) a recording characteristic element which reflects characteristics of the recording device in rendering a dot, such as the power distribution of the laser beam in the illustration in the preceding paragraph, and (b) a medium characteristic element which reflects characteristics of the medium necessary to render a dot, such as the threshold at which the medium would render a dot in the illustration in the preceding paragraph.

The image observation function filter 61 filters the output of the image rendering model filter 60 in relation to a function which represents the effect of the observer in observing the image. In one embodiment, the image observation function filter 61 makes use of the contrast sensitivity function, which represents sensitivity of the human eye as a function of spatial frequency, although it will be appreciated that other filter functions, including conventional low-pass filter functions, can be used. The output of the image observation function filter 61, which is in the form of an array having a number of rows and columns corresponding to that of the current pattern input to the image rendering model filter 60, is provided to an error map generator 64 that receives the array output from the image observation filter 61, subtracts the average pixel value from each pixel value and compares the absolute value to that difference to generate an error map which generally will have relatively large error values for clusters of pixels which are deemed large enough for the eye to see. Accordingly, the error map generated by the error map generator 64 will emphasize relatively large clusters of pixels associated with a single color, which may increase the degree of grain in an image as rendered by a rendering device.

The neighborhood filter 62 also receives the current pattern from the selector 63 and filters it in relation to a neighborhood filter function. The neighborhood filter function is a high-pass filter selected so as to generate an indication relating to the difficulty or inability of the rendering device to render an individual or cluster of, for example, black pixels in a region of white pixels. In one embodiment, the neighborhood filter function is in the form of a delta function "δ" [which corresponds to value "1" where $(x,y)=(x_0,y_0)$ and zero elsewhere] minus a two-dimensional Gaussian function, or $$k\left[\delta(x-x_0, y-y_0) - e^{-\frac{(x-x_0)^2}{2\sigma^2}} e^{-\frac{(y-y_0)^2}{2\sigma^2}}\right],$$

where "x" and "y" are taken as the horizontal and vertical coordinates for the pattern, and "$x_0$" and "$y_0$" are the coordinates of the particular pixel which is being filtered, and "k" is a constant. The output of the neighborhood filter 62 comprises the error map generated for the mottle filter path 69. It will be appreciated that the neighborhood filter function as described above will provide for error values which are larger for individual or small clusters of pixels of a single value, with the size of clusters that are so penalized being related to the value of "σ," which may be selected for use in the Gaussian function. Accordingly, the neighborhood filter 62 may generate error values that tends to penalize those features which may give rise to mottle, such as individual pixels or small groups of pixels of the same value, with the size of the group being related to the value selected for "σ."

The outputs of both filter paths 68 and 69 are coupled to respective multipliers 66 and 67, which multiply the error maps generated by the respective generators 64 and 65 by a complementary weighting factors "λ" and "1−λ," where the value for "λ" may be selected by an operator in the range between zero and one. It will be appreciated that, larger values for λ will increase the contribution to the composite error map by the error map as generated by the map generator 64 in response to the output of the image rendering model filter 60 and image observation function filter 61, whereas larger values for "1−λ" (or smaller values for "λ") will increase the contribution by the error map as generated by the neighborhood filter 62. Accordingly, an operator, by varying the value for λ, may adjust the amount of grain and mottle observed in an image, with smaller values for λ resulting in less likelihood of mottle, and larger values for λ resulting in smaller amounts of grain. Since the actual amount of mottle which is present in a rendered image will depend on the variations which are actually present in the rendering process, it will be appreciated that the value for λ will only effect the likelihood of mottle, not the actual amount of mottle which will be present.

Figure 7:
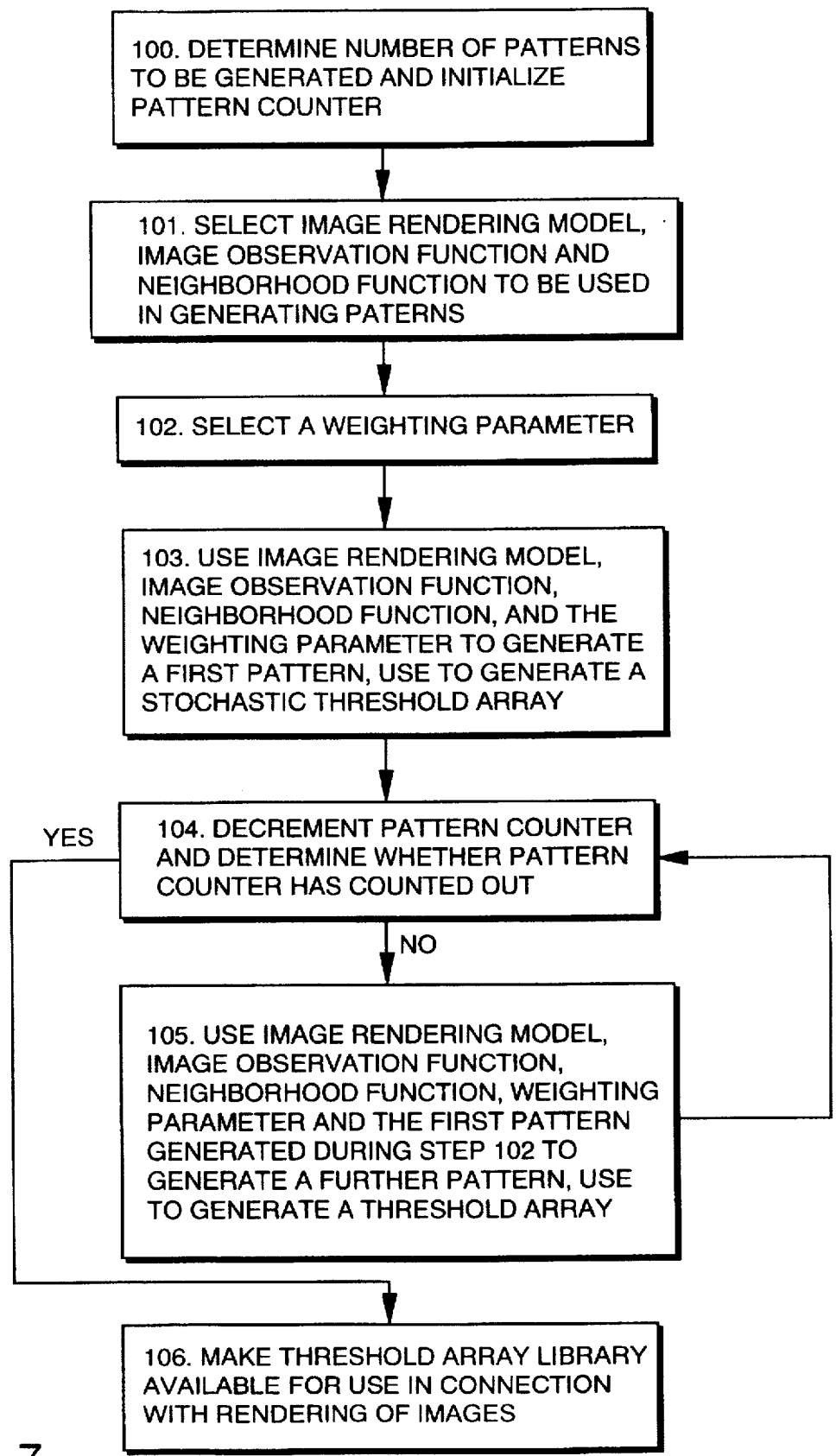
FIG. 7 is a flow diagram depicting the general operations performed by the stochastic threshold array generating system in connection with generation of stochastic threshold arrays in accordance with the invention, which are useful in the image rendering system depicted in FIG. 2.

With this background, the detailed operations performed by the stochastic threshold array generation system 21 will be described in connection with the flow charts depicted in FIGS. 7 through 9E. FIG. 7 depicts the general operations performed by the stochastic threshold array generation system 21, while FIGS. 8A through 8E together comprise a flow-chart depicting the detailed operations performed by the stochastic threshold array generating system 21 in connection with generation of an initial optimized pattern and the stochastic threshold array therefrom, and FIGS. 9A through 9E together comprise a flow-chart depicting the detailed operations performed by the stochastic threshold array generating system 21 in connection with generation of the subsequent optimized patterns and the stochastic threshold arrays therefrom. With reference initially to FIG. 7, the stochastic threshold array generation system 21 will perform several initialization steps. First the stochastic threshold array generation system 21 will determine the number of stochastic threshold arrays that it is to generate and will initialize a stochastic threshold array counter with this value (step 100). As will be described below, the stochastic threshold array generation system 21 will use the counter as a termination criterion to identify when it has finished generating all of the stochastic threshold arrays that it is to generate. The stochastic threshold array generation system 21 will select an image rendering model function, an image observation function and a neighborhood function to be used in connection with the filters 60 through 62 (FIG. 4) (step 101) and a value for the various parameters, including the error map weighting parameter "λ" and any parameters for the neighborhood function (step 102). In one embodiment, in which the neighborhood function is a Gaussian as defined above, the neighborhood function parameters whose values are to be supplied by the operator will include the value for "σ."

Thereafter, the stochastic threshold array generation system 21 will begin generating stochastic threshold arrays. Initially, the stochastic threshold array generation system 21 will use the image rendering model function, image observation function, neighborhood function, and the parameters to generate a first optimized pattern and will use the first optimized pattern to generate a stochastic threshold array to be provided to the stochastic threshold array library 22 (step 103). (The detailed operations performed by the stochastic threshold array generation system 21 in connection with step 103 will be described below in connection with FIGS. 8A through 8E.) After generating the initial stochastic threshold array, the stochastic threshold array generation system 21 will decrement stochastic threshold array counter and determine whether the counter has counted out (step 104). At this point, it will be assumed that the stochastic threshold array generation system 21 is to generate a number of stochastic threshold arrays, and so the counter will not have counted out. In that case, the stochastic threshold array generation system 21 will sequence to step 105, in which it will also use the image rendering model function, image observation function, neighborhood function, and the various parameters, as well as the first optimized pattern generated during step 103 to generate another optimized pattern and will use the just-generated optimized pattern in generating another stochastic threshold array to be added to the stochastic threshold array library. (The detailed operations performed by the stochastic threshold array generation system 21 in connection with step 105 will be described below in connection with FIGS. 9A through 9E.) Following step 105, the stochastic threshold array generation system 21 will return to step 104 to decrement the stochastic threshold array counter and determine whether the counter has counted out.

The stochastic threshold array generation system 21 will repeat operations described above in connection with steps 104 and 105 through a series of iterations, in each iteration generating a new optimized pattern and stochastic threshold array, until it determines in step 104 that the counter has counted out. At that point, it will have generated all of the stochastic threshold arrays it is to generate, and so it will sequence to step 106 to make the stochastic threshold arrays available to the image processing subsystem 23 for use in connection with processing of the input image data.

Figure 8A:
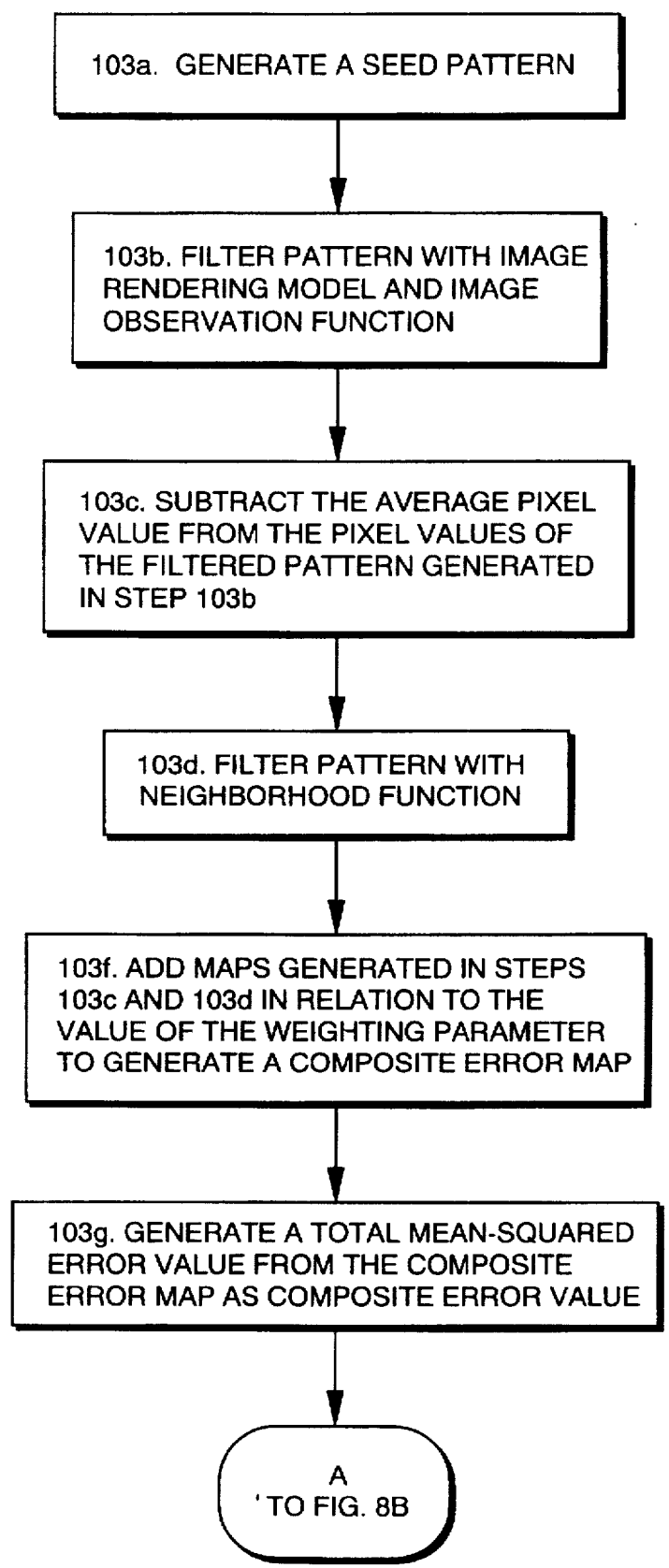
FIGS. 8A through 8E together comprise a flow diagram depicting the detailed operations performed by the stochastic threshold array generating system in connection with generation of an initial pattern and stochastic threshold array in response thereto.
Figure 8B:
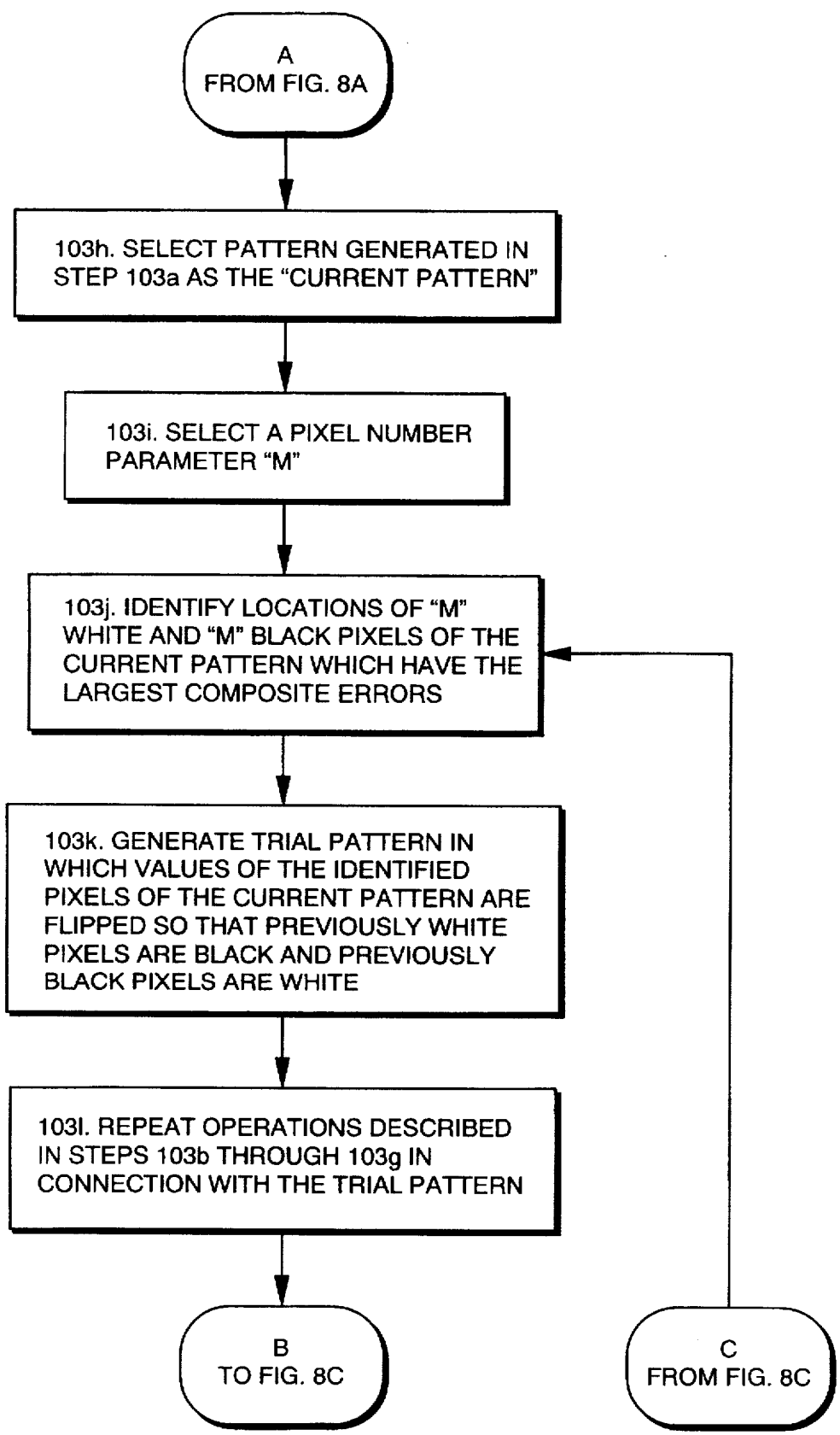
Figure 8C:
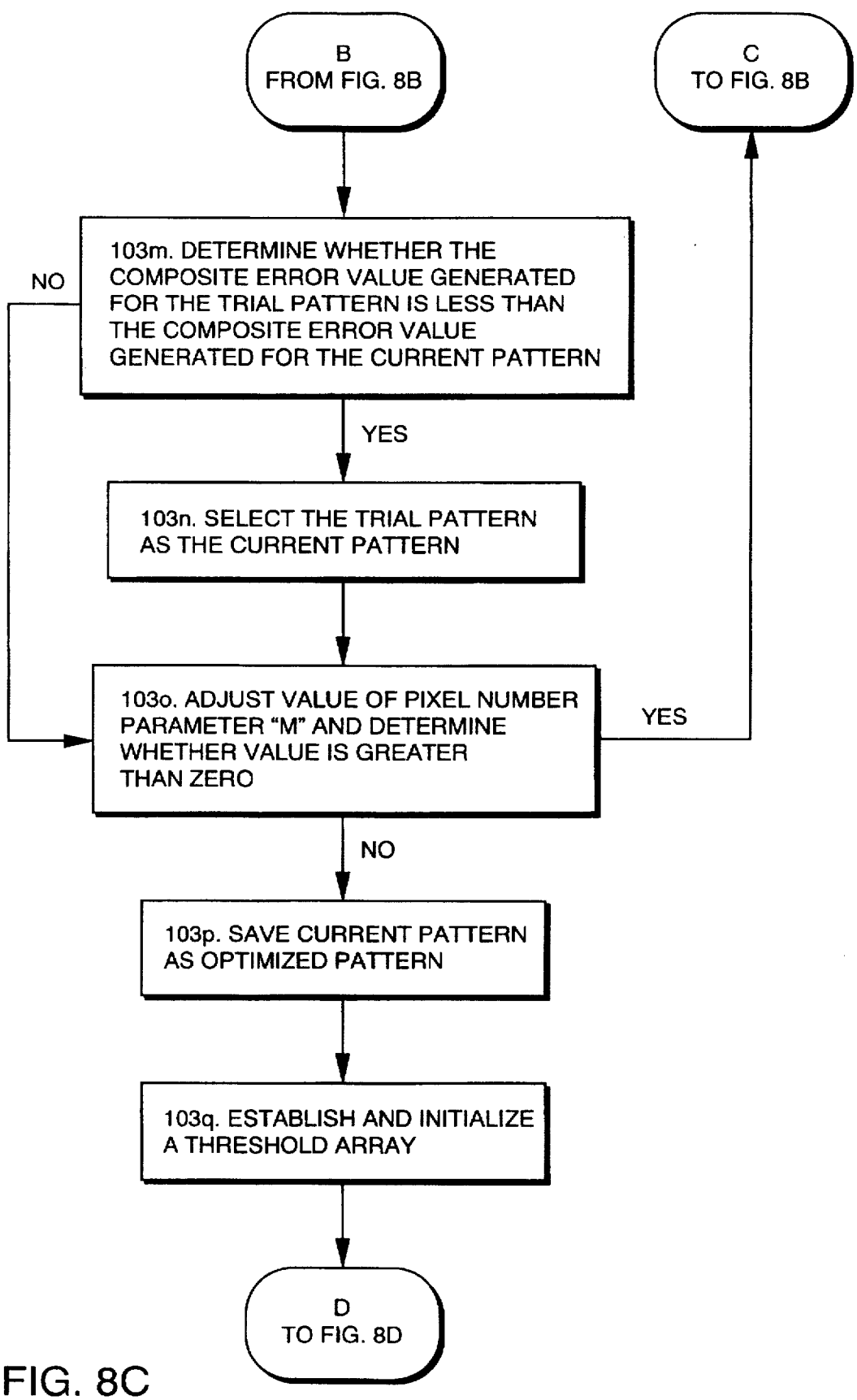
Figure 8D:
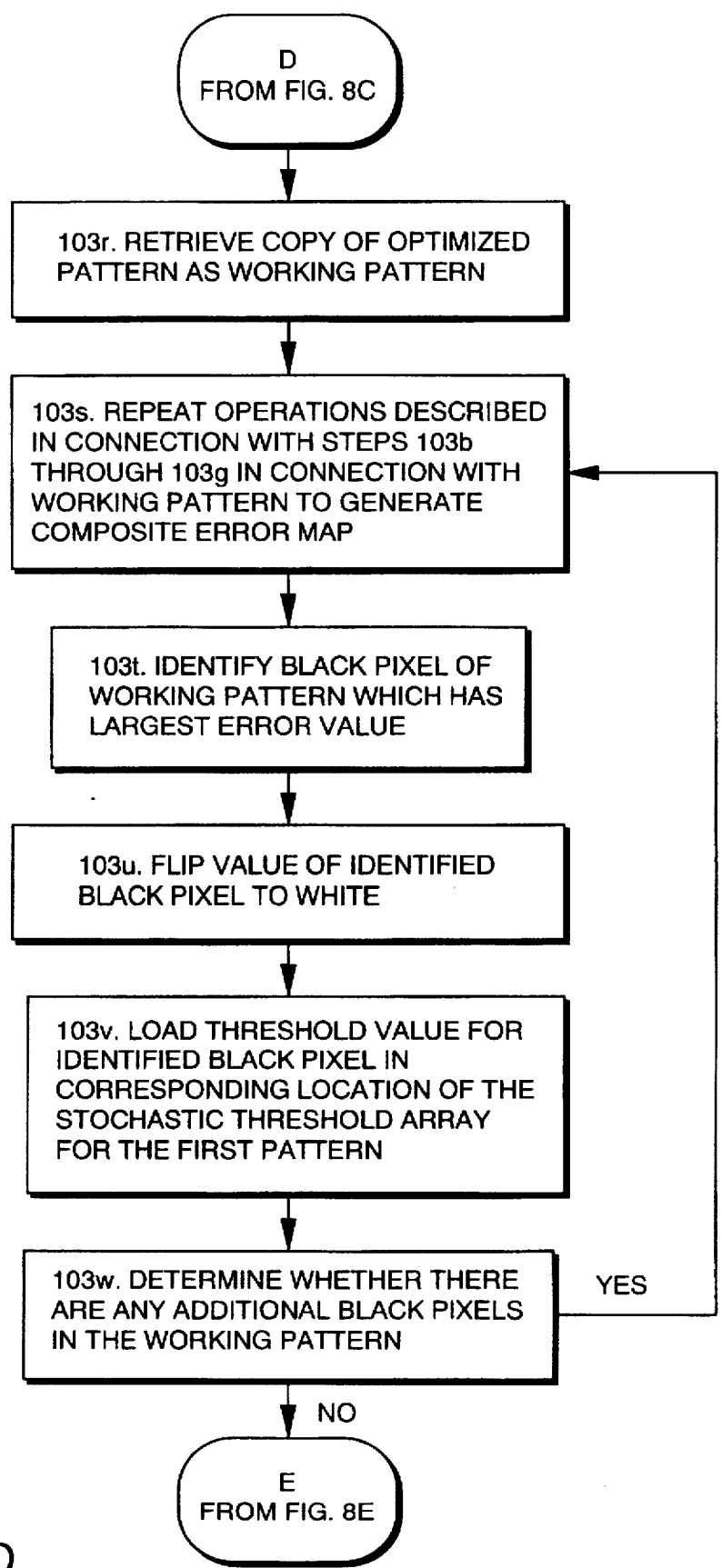
Figure 8E:
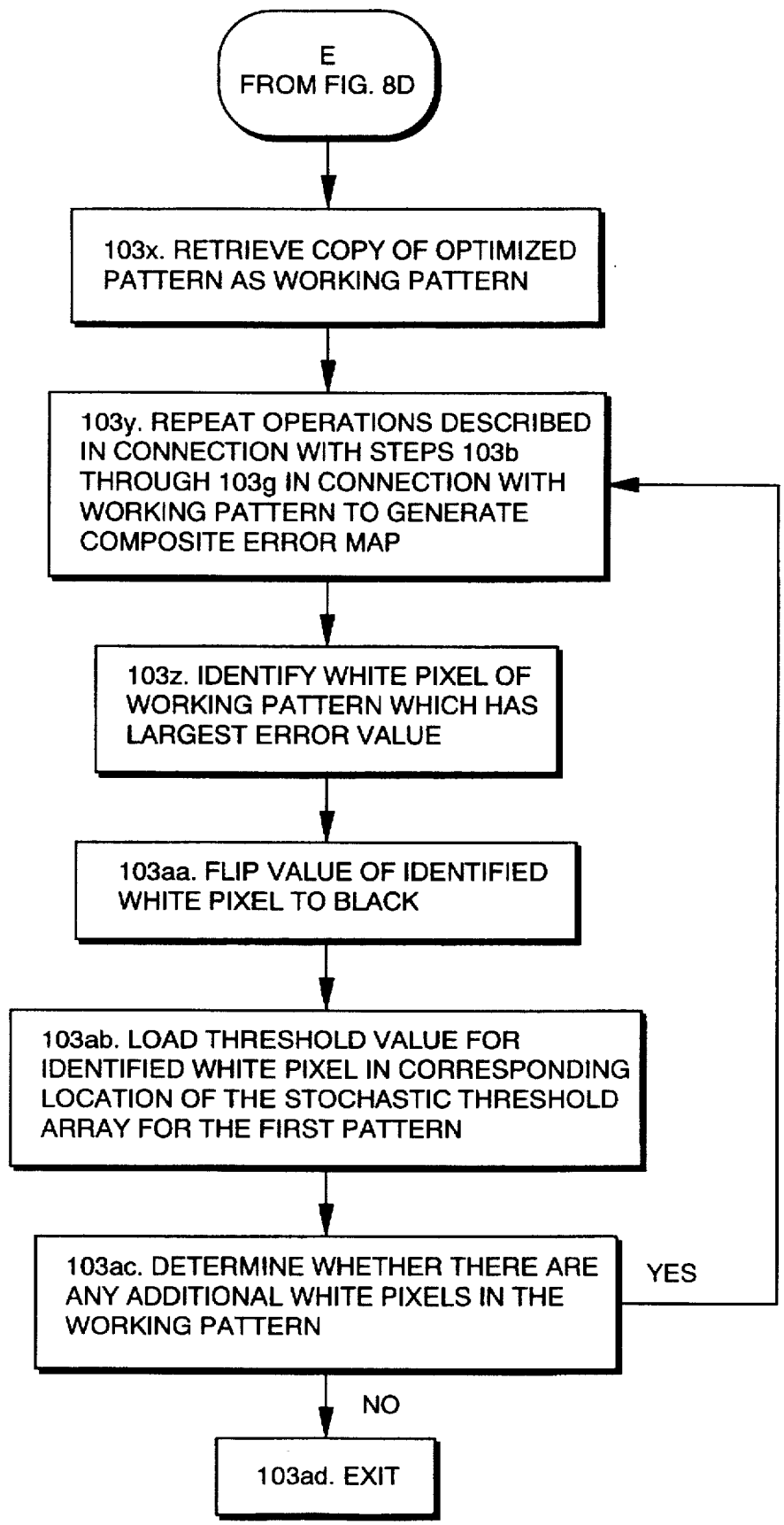
Figure 9A:
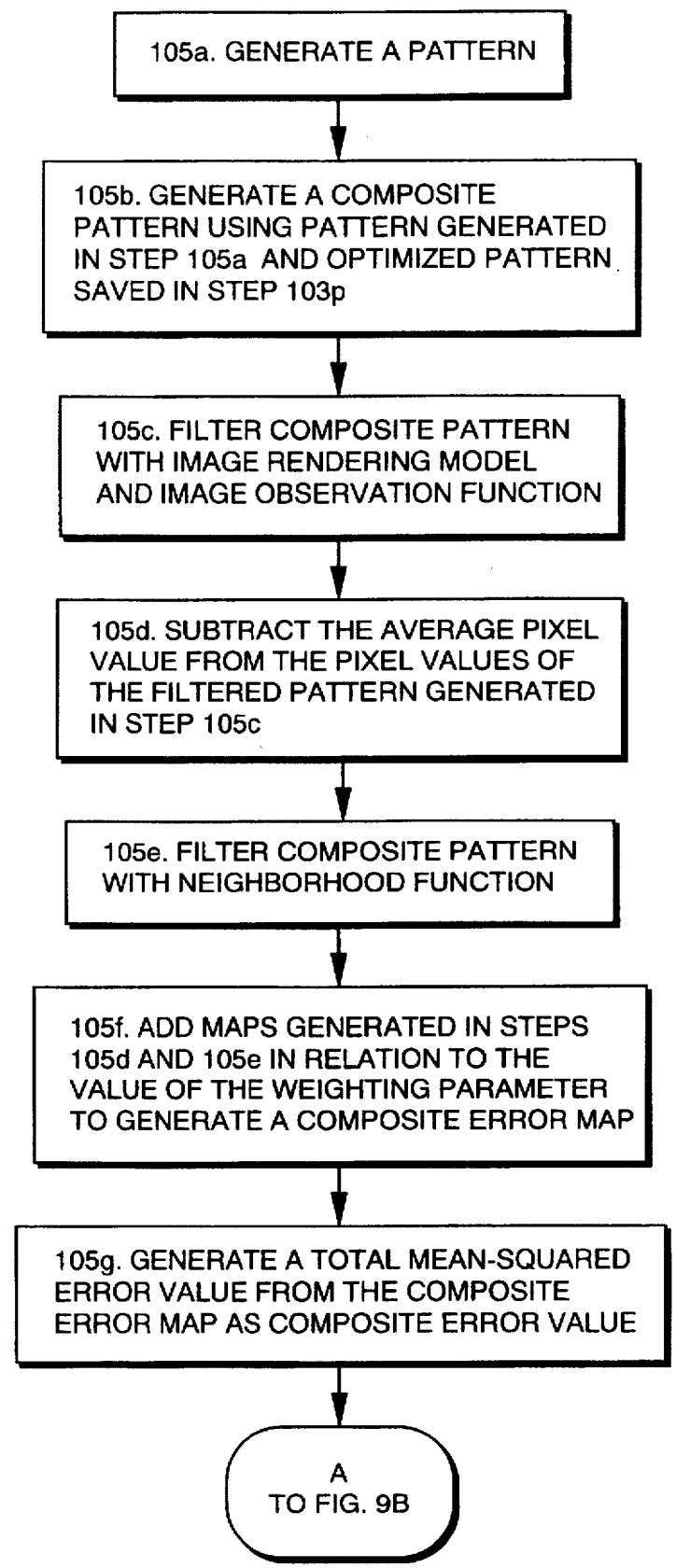
FIGS. 9A through 9E together comprise a flow diagram depicting the detailed operations performed by the stochastic screen generating system in connection with generation of subsequent patterns and stochastic threshold arrays.
Figure 9B:
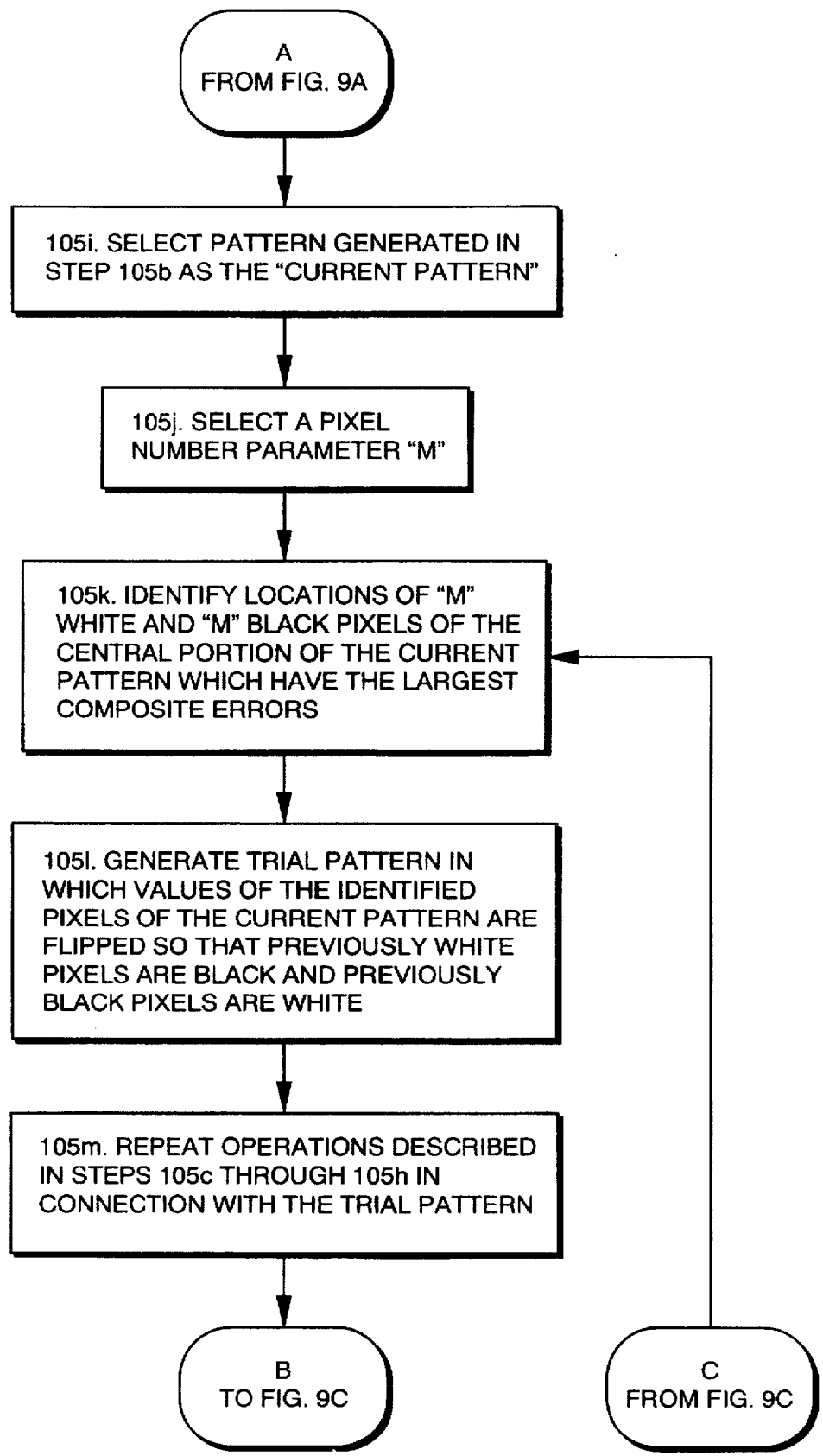
Figure 9C:
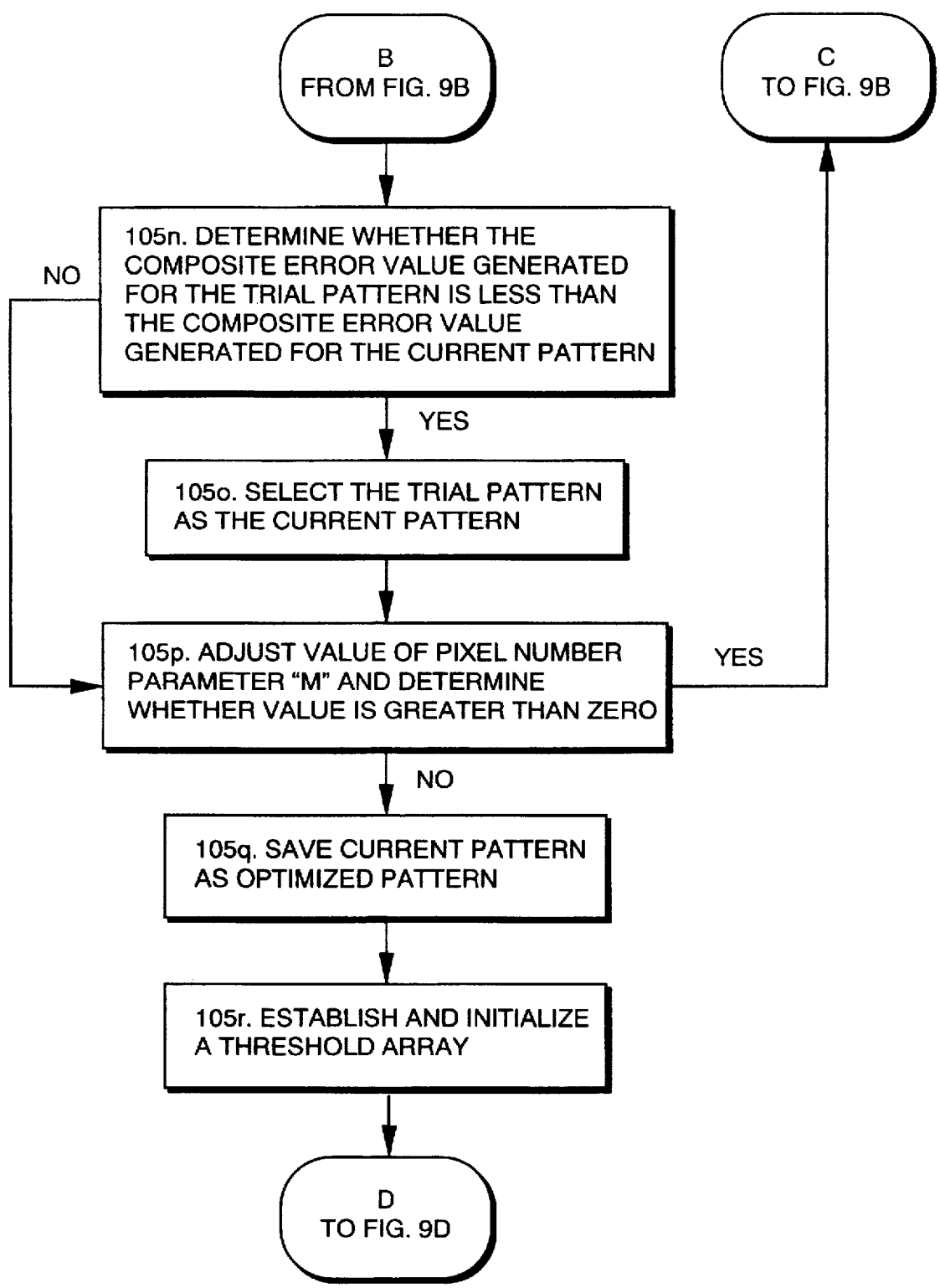
Figure 9D:
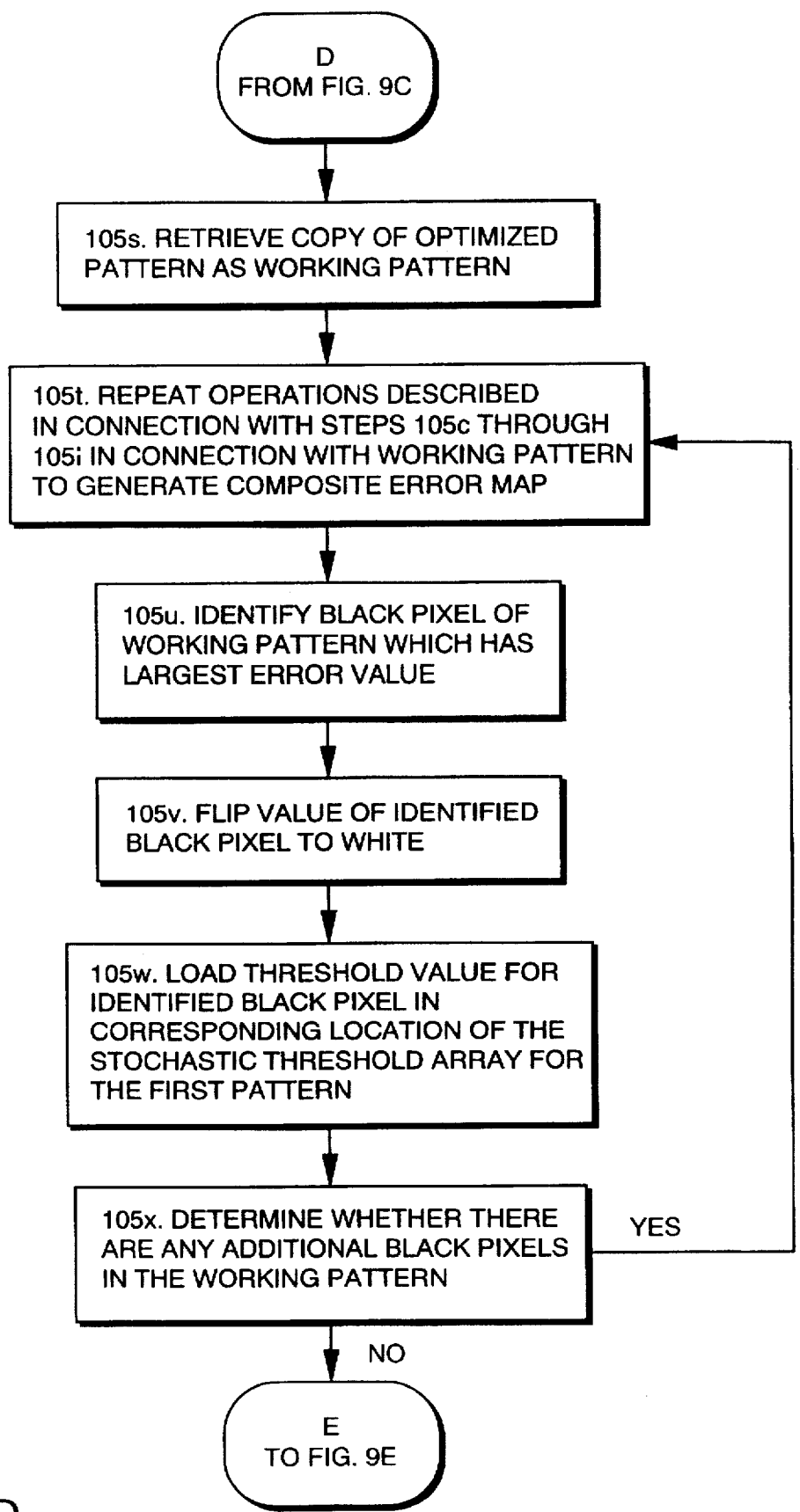
Figure 9E:
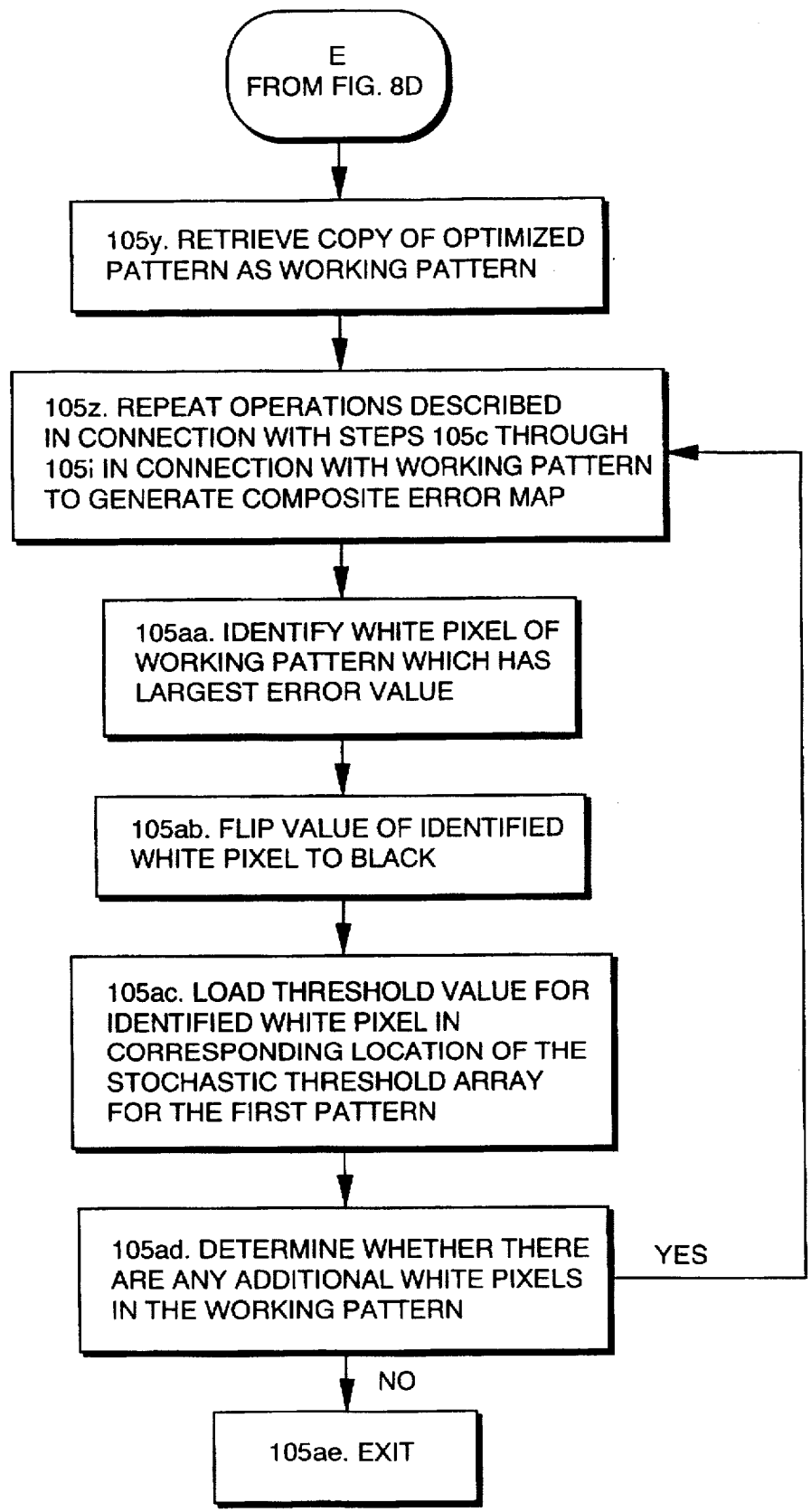

The detailed operations performed by the stochastic threshold array generation system 21 in connection with step 103, generation of the first optimized pattern and use of the first optimized pattern in generating the stochastic threshold array, will be described in connection with FIGS. 8A through 8E. With reference to FIG. 8A, the stochastic threshold array generation system 21 initially generates a seed pattern with randomly-assigned white and black pixel values (step 103a). It then, using the composite error map generator 52, filters the seed pattern as the current pattern with the image rendering model and image observation function filters 60 and 61 (step 103b) and generates the error map as described above in connection with the error map generator 64, namely, by subtracting the average pixel value from the pixel values of the filtered current pattern generated in step 103b, taking the absolute value, and coding clusters of black and white pixels as a gray-scale map (step 103c). The stochastic threshold array generation system 21 also filters the current pattern with neighborhood function filter 62 (step 103d) to generate a second error map. As noted above, in performing the filtering operations in steps 103b and 103e in connection with the first current pattern, the respective filters 60 through 62 operate in accordance with a two-dimensional circular convolution methodology.

The stochastic threshold array generation system 21 then applies the complementary weighting parameters "λ" and "1-λ" to the error maps generated in steps 103c and 103d, and adds the weighted error maps to generate a composite error map (step 103f). After generating the error maps, the stochastic threshold array generation system 21 generates a total mean-squared error value from the error values in the composite error map to generate the composite error value (step 103g). The stochastic threshold array generation system 21 may retain the total mean-squared error value in the composite error store 53 (FIG. 2). The composite error value is the sum of the squares of the error values generated for the array elements of the composite error map in step 103f and comprises a reflection of the degree of error for the seed pattern generated in step 103a as filtered by the image rendering model filter, image observation function filter and the neighborhood filter.

After generating the composite error maps and composite error value (step 103g), for the initial seed pattern generated in step 103a, the stochastic threshold array generation system 21 proceeds to a series of iterations, in each iteration updating the various black and white pixels of the current pattern associated with the largest error values, and processes the updated current pattern through the composite error map generator 52 (steps 103c through 103g) to generate a composite error map for the updated current pattern. If the composite error value, that is, the total mean squared error value, generated for the updated current pattern in each iteration is less than the composite error for the previous pattern, the updated current pattern will be used as the current pattern for the next iteration.

More specifically, the stochastic threshold array generation system 21 will initially select the seed pattern, that is, the pattern generated in step 103a, as the current pattern (step 103h). The stochastic threshold array generation system 21 then selects a pixel number parameter "m" (step 103i) and identifies the locations of "m" white and "m" black pixels of the current pattern which, based on the composite error map generated in step 103f are associated with the largest values for the composite error map (step 103j). The stochastic threshold array generation system 21 then generates a trial updated pattern in which values of the identified pixels of the current pattern, that is, the pixels associated with the largest values of the composite error map, are flipped so that previously white pixels are black and previously black pixels are white (step 103k). The stochastic threshold array generation system 21 repeats the operations described above in connection with steps 103b through 103g in connection with the trial updated pattern (step 103l) so as to generate a composite error map and a composite error value for the trial updated pattern. If the composite error value generated for the trial updated pattern is less than the composite error value generated for the current pattern (step 103m), the stochastic threshold array generation system 21 selects the trial updated pattern as the current pattern (step 103n). On the other hand, if the stochastic threshold array generation system 21 determines in step 103m that the composite error value generated for the trial updated pattern is not less than the composite error value generated for the current pattern (step 103m), the stochastic threshold array generation system 21 maintains the current pattern and discards the trial updated pattern. It will be appreciated that, if the composite error value of the trial updated pattern is not less than that for the current pattern, the arrangement of black and white pixels of the trial updated pattern is no better than that of the current pattern, and will be worse if the composite error value for the trial updated pattern is greater than that of the current pattern.

After selecting either the trial updated pattern or the current pattern as a new current pattern, the stochastic threshold array generation system 21 selects a new value for pixel number parameter "m" (step 103o). If, in step 103m, the stochastic threshold array generation system 21 determined that the composite error value for the trial updated pattern was less than that for the current pattern it maintains the value for "m," but if it determines that the composite error value was not reduced, it reduces the value for "m." If the value of pixel number parameter "m" is greater than zero, the stochastic threshold array generation system 21 returns to step 103j to repeat the operations described in connection with steps 103j through 103o in connection with the new value of the pixel number parameter "m." The stochastic threshold array generation system 21 will repeat these operations until it determines, in step 103o that the pixel number parameter "m" has the value zero, at which point it will sequence to step 103p.

At this point, the "current pattern" has an optimized pattern of white and black pixels, that is, optimized in relation to the original seed pattern as generated in step 103a, and the image rendering model filter, the image observation function filter and the neighborhood function filter, and also optimized in relation to the weighting parameter value "λ." In step 103p, the stochastic threshold array generation system 21 will save the current pattern as optimized pattern for future use.

Following step 103p, the stochastic threshold array generation system 21, in particular the stochastic threshold array generator 43, will retrieve the optimized pattern saved in step 103p and generate a stochastic threshold array in response thereto. The stochastic threshold array generation system 21 will perform these operations in two phases, in one phase generating a series of threshold values for the black pixels of the optimized pattern which are stored in locations of the stochastic threshold array corresponding to the locations of the black pixels in the optimized pattern. In the second phase, the stochastic threshold array generation system 21 generates a series of threshold values for the white pixels of the optimized pattern which are stored in locations of the stochastic threshold array corresponding to the locations of the white pixels in the optimized pattern. In each phase, the stochastic threshold array generation system 21 performs a series of iterations in connection with a copy of the optimized pattern, in each iteration using the composite error map generator 52 to generate a composite error map as described above in connection with steps 103b through 103g to identify the respective black or white pixel for which the composite error value is the largest. The stochastic threshold array generation system 21 flips the identified pixel from black to white or from white to black, and assigns an appropriate threshold value. In one embodiment, the appropriate threshold value is generated by filtering the updated optimized pattern with the image rendering model filter 60 to generate a filtered updated optimized pattern, summing the result over the filtered updated optimized pattern and normalizing the sum over the area represented by the updated optimized pattern. This will provide that any threshold array generated by stochastic threshold array generation system 21 will produce the same space-average density.

More specifically, in the first phase, the stochastic threshold array generation system 21 initially retrieves the optimized pattern and stores it as a working pattern (step 103q). The stochastic threshold array generation system 21 repeats operations described in connection with steps 103b through 103g in connection with the working pattern to generate composite error map (step 103r) and identifies the black pixel of working pattern which has largest error value (step 103s). The stochastic threshold array generation system 21 then flips the value of the identified black pixel to white (step 103t), thereby generating a new gray level for the working pattern, and generates a threshold value for the identified black pixel, which it loads into the corresponding location of the stochastic threshold array (step 103u). The stochastic threshold array generation system 21 determines whether there are any additional black pixels in the working pattern (step 103v) and, if so, returns to step 103r to repeat the operations in connection with the working pattern.

The stochastic threshold array generation system 21 will repeat the operations described above in connection with steps 103r through 103v through a series of iterations until it determines in step 103v that the working pattern does not have any black pixels. At that point, it will sequence to step 103w to begin the second stochastic threshold array generation phase. In the second phase, the stochastic threshold array generation system 21 also begins from the optimized pattern generated in step 103p. Initially, the stochastic threshold array generation system 21 retrieves the optimized pattern generated in step 103p and stores it as a working pattern (step 103w). The stochastic threshold array generation system 21 repeats operations described in connection with steps 103b through 103g in connection with the working pattern to generate a composite error map (step 103x) and identifies the white pixel of working pattern which has largest error value (step 103y). The stochastic threshold array generation system 21 then flips the value of the identified white pixel to black (step 103z), thereby generating a new gray level for the working pattern, and generates a threshold value for the identified white pixel, which it loads into the corresponding location of the stochastic threshold array (step 103aa). The stochastic threshold array generation system 21 determines whether there are any additional white pixels in the working pattern (step 103ab) and, if so, returns to step 103x to repeat the operations in connection with the working pattern. The stochastic threshold array generation system 21 repeats the operations described in connection with steps 103x through 103ab through a series of iterations until it determines in step 103ab that all of the pixels are black. At that point, the stochastic threshold array generation system 21 will have generated threshold values for all pixels of the stochastic threshold array associated with the first optimized pattern, and so it will exit the routine (step 103ac) and provide the stochastic threshold array to the stochastic threshold array library 22.

After generating the first optimized pattern and the associated stochastic threshold array, the stochastic threshold array generation system 21 can generate subsequent patterns and associated stochastic threshold arrays. The operations performed by the stochastic threshold array generation system 21 in connection with those operations are depicted in FIGS. 9A through 9E. Generally, the operations are similar to those in connection with the first pattern and will not be repeated in detail here. The primary difference between the operations performed in connection with the subsequent patterns and associated stochastic threshold arrays is as follows. As indicated above in connection with steps 103b and 103d, the filtering performed by the composite error map generator 52 is in the nature of two-dimensional circular convolution methodology. On the other hand, in steps 105c and 105e, as described above in connection with the pattern generator 51 (FIG. 3) and as indicated in step 105b, the new seed pattern that is generated in step 105a (which corresponds to the pattern generated by the seed pattern generator 50, FIG. 3) is tiled with the optimized pattern previously generated in step 103p, that is, a composite seed pattern 47 (FIG. 5) is generated in which the new seed pattern is surrounded by the previously-generated optimized pattern, and the stochastic threshold array generation system 21, in particular the composite error map generator 52, operates in connection with that pattern in performing steps 105c through 105h. In generating the new optimized pattern (steps 105i through 105q), stochastic threshold array generation system 21 modifies the pixels only of the central portion 48, that is, the portion of the composite pattern 47 from which the new seed pattern was derived.

In generating the stochastic threshold array (steps 105r through 105w for the first phase, and steps 105x through 105ad for the second phase), the stochastic threshold array generation system 21 uses the optimized composite pattern 47 saved in step 105q, updating the pixels of the central portion 48 in a manner similar to that described above in connection with steps 103u and 103aa. In addition, when, in generating a stochastic threshold array, the stochastic threshold array generation system 21 updates a pixel in the central portion 48 to generate a new threshold value corresponding to a new gray level, it in addition updates pixels in the peripheral portions 49 of the optimized composite pattern 47. The pixels in the peripheral portions 49 which are updated correspond to those pixels for which the previously-generated stochastic threshold array values correspond to the new threshold value to be generated, thereby to maintain the peripheral portions 49 at the new gray level.

In this manner, the stochastic threshold array generation system 21 generates the new optimized pattern and associated threshold values using the previously-generated optimized pattern, to ensure that the stochastic threshold arrays will tile with each other with reduced boundary artifacts.

It will be appreciated that the two-dimensional circular filtering methodology performed by the composite error map generator 52 in connection with the first optimized pattern (steps 103b and 103d) is generally similar to the filtering of the patterns in generating the subsequent optimized patterns (steps 105d and 105e), and is performed to ensure that the stochastic threshold array generated in response to the first optimized pattern will minimize generation of undesirable boundary artifacts if it is tiled with itself when used by the image processing subsystem 23 (FIG. 2).

The image rendering system 20 provides a number of advantages. First, by randomly selecting and using the stochastic threshold arrays generated as described above, the system 20 will reduce generation of the undesirable tiling artifacts which are commonly generated in connection with rendering systems which use a single stochastic threshold array. By using stochastic threshold arrays which have been optimized from seed patterns which were initially randomly generated, but are optimized together, the stochastic threshold arrays generated in response to the patterns will generally tile with reduced edge effects. In addition, by generating the stochastic threshold arrays in relation to both a image rendering model filter/image observation function filter, which enables generation of error values which tend to penalize large clusters of pixels of a particular value, and a neighborhood filter which enables generation of error values which tend to penalize individual pixels or small clusters of pixels of a particular value, and by providing a weighting parameter (namely, "λ" as described above) that an operator may control, the operator may effectively control the degree of grain (large clusters of pixels of a particular value) and likelihood of mottle (individual pixels or small clusters of pixels of a particular value) by appropriate selection of the weighting parameter, in generation of the stochastic threshold arrays and rendering of the discrete-tone images in response thereto. Further, in an image rendering system in which the neighborhood filter uses a two-dimensional Gaussian function as the neighborhood filter function as described above, the operator may also control the likelihood of mottle, by appropriate selection of a second parameter, namely, "σ" described above.

Although the image rendering system 20 has been described in connection with patterns having black and white pixels, it will be appreciated that the threshold arrays generated in response thereto may be used in connection with rendering of discrete-tone color images as well as discrete-tone black and white (or monochrome) images. In rendering discrete tone color images, the image data processor 26 (FIG. 2) may process the input image data on a color-by-color basis using the threshold matrices as described above in connection with FIG. 2. It will be appreciated, however, that if the filter function for any or all of the image rendering model filter 60, image observation function filter 61 or the neighborhood filter 62 differ among the different colors, separate stochastic threshold arrays will generally be generated for the different colors.

In addition, it will be appreciated that the pattern optimizing section 41 may operate in accordance with other optimization methodologies, for example, simulated annealing, direct binary search, model-based error diffusion and other well-known techniques, with the attainment of some or all of the advantages described above.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An image rendering system for generating discrete tone image data of an image for representing continuous tone image data to be rendered by a rendering device, the image rendering system comprising:

A. a stochastic threshold array library for storing a plurality of stochastic threshold arrays generated from individual seed patterns each corresponding to a predetermined tone of the image, each said seed pattern optimized to reflect corresponding predetermined grain/mottle trade-off conditions and optimal visual tiling characteristics when said seed pattern is tiled with itself; and B. an image data processing section for processing the continuous tone image data in relation to said stochastic threshold arrays, and for retrieving one said stochastic threshold array for one of the predetermined grain/mottle trade-off conditions, as selected by an operator, from said stochastic threshold array library, tiling the retrieved stochastic threshold array over the continuous-tone image data and generating the discrete tone image data in response to correspondingly positioned pixels of the continuous-tone image data and threshold values of the tiled stochastic threshold array.

2. An image rendering system for generating discrete tone image data representing continuous-tone image data for rendering by a rendering device, the image rendering system comprising:

A. a stochastic threshold array library for storing a plurality of stochastic threshold arrays generated from individual seed patterns optimized to have optimal visual tiling characteristics when randomly tiled together; and B. an image data processing section for processing the continuous tone image data in relation to the stochastic threshold arrays, randomly retrieving the stochastic threshold arrays from said stochastic threshold array library, tiling said retrieved stochastic threshold arrays randomly over the continuous-tone image data and generating the discrete tone image data in response to both correspondingly positioned pixels of the continuous-tone image data and threshold values of the tiled stochastic threshold arrays.

3. The image rendering system of claim 2 in which said stochastic threshold arrays are generated according to the steps of:

A. generating a plurality of optimized stochastic patterns each from a respective seed stochastic pattern, at least some of the optimized stochastic patterns each being generated from said respective seed stochastic pattern and a previously-generated optimized stochastic pattern to thereby provide that the optimized stochastic pattern so generated, when tiled with others of the optimized stochastic patterns, will have optimal visual tiling characteristics proximate their respective edges; and B. generating each stochastic threshold array using one of said optimized stochastic patterns.

4. The image rendering system of claim 3 in which said optimized stochastic pattern generating step comprises the steps of:

A. generating an initial stochastic pattern, the initial stochastic pattern for the first iteration comprising said respective seed stochastic pattern, and at least some initial stochastic patterns for use in generating optimized stochastic patterns after the first optimized stochastic pattern including said respective seed stochastic pattern surrounded by copies of at least one optimized stochastic pattern generated during a previous iteration; and B. optimizing the initial stochastic pattern.

5. The image rendering system of claim 4 in which the stochastic pattern optimizing step comprises the steps of iteratively:

A. generating an error map reflecting differences between a stochastic pattern provided thereto and processing performed by the rendering device in rendering an image defined by the stochastic pattern and psychovisual processing as performed by an observer in viewing the image;

B. generating an updated stochastic pattern in relation to the error map generated during the iteration, the updated stochastic pattern being used as the stochastic pattern used in generating the error map during a subsequent iteration.

6. The image rendering system of claim 5 in which each stochastic pattern comprises pixels represented by two complementary colors, the updated stochastic pattern update pattern generating step comprising the step of alternating the colors of selected numbers of pixels of each color to their respective complementary colors, the number being selectively reduced for successive iterations.

7. The image rendering system of claim 5 in which each stochastic pattern comprises a plurality of pixels, and in which the error map generation step comprises the steps of:

A. generating a rendering device error map which minimizes grain by identifying errors in connection with processing by the rendering device of an image represented by the stochastic pattern provided thereto in connection with rendering of large clusters of pixels;

B. generating a neighborhood error map which minimizes mottle by identifying errors in connection with processing by the rendering device of an image represented by the stochastic pattern provided thereto in connection with rendering of small clusters of pixels; and C. generating a composite error map which provides a grain/mottle tradeoff in response to both the rendering device error map and the neighborhood error map.

8. The image rendering system of claim 7 in which the rendering device error map generating step includes the steps of:

A. performing a rendering device filtering operation in connection with the stochastic pattern to generate a rendering device filtered stochastic pattern, the rendering device filtered stochastic pattern reflecting processing performed by the rendering device in rendering large clusters of pixels comprising the stochastic pattern;

B. performing a contrast sensitivity filtering operation in connection with the rendering device filtered stochastic pattern to generate a contrast sensitivity filtered stochastic pattern, the contrast sensitivity filtered stochastic pattern reflecting the psychovisual processing performed by the observer in connection with the observing the rendering device filtered stochastic pattern; and C. generating the rendering device error map identifying differences between the stochastic pattern and the contrast sensitivity filtered stochastic pattern in connection with large clusters of pixels.

9. The image rendering system of claim 8 in which, during processing of the initial stochastic pattern and updated stochastic patterns while generating the first optimized stochastic pattern, the rendering device filtering operation and the contrast sensitivity filtering operation are both performed in accordance with a circular convolution filtering methodology.

10. The image rendering system of claim 7 in which the composite error map generation step comprises the steps of:

A. performing a neighborhood filtering operation in connection with the stochastic pattern to generate a neighborhood filtered stochastic pattern, the neighborhood filtered stochastic pattern reflecting processing performed by the rendering device in rendering small clusters of pixels comprising the stochastic pattern; and B. generating the neighborhood error map identifying differences between the stochastic pattern and the neighborhood filtered stochastic pattern in connection with small clusters of pixels.

11. The image rendering system of claim 10 in which, during processing of the initial stochastic pattern and updated stochastic patterns while generating the first optimized stochastic pattern, the neighborhood filtering operation is performed in accordance with a circular convolution filtering methodology.

12. The image rendering system of claim 10 in which the neighborhood error map is generated from the stochastic pattern using a filter in which each pixel is generated according to the form of a constant value minus a predetermined Gaussian function, the predetermined Gaussian function having a parameter that may be varied to vary the filtered cluster size.

13. The image rendering system of claim 12 in which the neighborhood error map is generated from the stochastic pattern using a filter applied to each pixel of the stochastic pattern of the form $$k\left[\delta(x-x_0, y-y_0) - e-\left(\frac{(x-x_0)^2}{2\sigma^2}\right)e-\left(\frac{(y-y_0)^2}{2\sigma^2}\right)\right],$$

where "x" and "y" are horizontal and vertical axes, respectively, of the stochastic pattern. "x0" and "y0" are coordinates along the respective "x" and "y" axes of the pixel being filtered. "k" and "F" are constants having selected values, with F being variable to vary the filtered cluster size, and "$\delta$" is a delta function corresponding to the value "1" where (x,y)=(x0,y0) and zero elsewhere.

14. The image rendering system of claim 7 in which the composite error map generation step includes the steps of:

A. generating a weighted rendering device error map from the rendering device error map and a weighted neighborhood error map from the neighborhood error map both from a weighting value; and B. generating said combined error map from the weighted rendering device error map and the weighted neighborhood error map.

15. The image rendering system of claim 14 in which the weighting value is selected by an operator.

16. The image rendering system of claim 1 in which each said stochastic threshold array is generated according to the steps of:

A. generating an optimized stochastic pattern from a seed stochastic pattern according to the steps of:
  i. generating an initial stochastic pattern; and
  ii. optimizing the initial stochastic pattern by, in a series of iterations,
    a. generating an error map reflecting differences between a stochastic pattern provided thereto and a rendering device filtered stochastic pattern that represents processing performed by the rendering device in rendering an image defined by the stochastic pattern and a neighborhood filtered stochastic pattern representing psychovisual processing as performed by an observer in viewing the image, respective contributions of the rendering device filtered stochastic pattern and the neighborhood filtered stochastic pattern to the error map being determined by respective complementary weighting factors, differing complementary weighting factors being used during optimizing for the stochastic threshold arrays thereby to provide differing grain/mottle tradeoff conditions;
    b. generating an updated stochastic pattern in relation to the error map generated during the iteration, the update stochastic pattern being used as the stochastic pattern used in generating the error map during a subsequent iteration; and B. generating the stochastic threshold arrays from the optimized stochastic patterns.

17. The image rendering system of claim 16 in which each stochastic pattern comprises a plurality of pixels, and in which the error map generation step comprises the steps of:

A. generating a rendering device error map which minimizes grain by identifying errors in connection with processing by the rendering device of an image represented by the stochastic pattern provided thereto in connection with rendering of large clusters of pixels;

B. generating a neighborhood error map which minimizes mottle by identifying errors in connection with processing by the rendering device of an image represented by the stochastic pattern provided thereto in connection with rendering of small clusters of pixels; and C. generating a composite error map which provides a grain/mottle tradeoff in response to both the rendering device error map and the neighborhood error map using the complementary weighting values to determine respective contributions of the rendering device error map and the neighborhood error map to the composite error map.

18. The image rendering system of claim 17 in which the rendering device error map generating step includes the steps of:

A. performing a rendering device filtering operation in connection with the stochastic pattern to generate a rendering device filtered stochastic pattern, the rendering device filtered stochastic pattern reflecting processing performed by the rendering device in rendering large clusters of pixels comprising the stochastic pattern;

B. performing a contrast sensitivity filtering operation in connection with the rendering device filtered stochastic pattern to generate a contrast sensitivity filtered stochastic pattern, the contrast sensitivity filtered stochastic pattern reflecting the psychovisual processing performed by the observer in connection with the observing the rendering device filtered stochastic pattern; and C. generating the rendering device error map identifying differences between the stochastic pattern and the contrast sensitivity filtered stochastic pattern in connection with large clusters of pixels.

19. The image rendering system of claim 18 in which, during processing of the initial stochastic pattern and updated stochastic patterns while generating the first optimized stochastic pattern, the rendering device filtering operation and the contrast sensitivity filtering operation are both performed in accordance with a circular convolution filtering methodology.

20. The image rendering system of claim 17 in which the composite error map generation step comprises the steps of:

A. performing a neighborhood filtering operation in connection with the stochastic pattern to generate a neighborhood filtered stochastic pattern, the neighborhood filtered stochastic pattern reflecting processing performed by the rendering device in rendering small clusters of pixels comprising the stochastic pattern; and B. generating the neighborhood error map identifying differences between the stochastic pattern and the neighborhood filtered stochastic pattern in connection with small clusters of pixels.

21. The image rendering system of claim 20 in which, during processing of the initial stochastic pattern and updated stochastic patterns while generating the first optimized stochastic pattern, the neighborhood filtering operation is performed in accordance with a circular convolution filtering methodology.

22. The image rendering system of claim 20 in which the neighborhood error map is generated from the stochastic pattern using a filter in which each pixel is generated according to the form of a constant value minus a predetermined Gaussian function, the predetermined Gaussian function having an parameter that may be varied to vary the filtered cluster size.

23. The image rendering system of claim 22 in which the neighborhood error map is generated from the stochastic pattern using a filter applied to each pixel of the stochastic pattern of the form $$k\left[\delta(x-x_0,y-y_0)-e-\left(\frac{(x-x_0)^2}{2\sigma^2}\right)e-\left(\frac{(y-y_0)^2}{2\sigma^2}\right)\right],$$

where "x" and "y" are horizontal and vertical axes, respectively, of the stochastic pattern, "x0" and "y0" are coordinates along the respective "x" and "y" axes of the pixel being filtered, "k" and "F" are constants having selected values, with F being variable to vary the filtered cluster size, and "δ" is a delta function corresponding to the value "1" where (x,y)=(x0,y0) and zero elsewhere.

24. A stochastic threshold array generating subsystem for generating a plurality of stochastic threshold arrays for use in connection with generation of output image data from continuous tone image data for rendering by a rendering device, said stochastic threshold array generating subsystem comprising:
  A. a stochastic pattern generator for generating a plurality of optimized stochastic patterns each from a respective seed stochastic pattern, at least one of said optimized stochastic patterns being generated in response to both said respective seed stochastic pattern and a previously generated stochastic pattern, said at least one pattern, when tiled with others of said optimized stochastic patterns, having optimal visual tiling characteristics proximate to respective edges of said tiled patterns; and
  B. a stochastic threshold array generator for generating the stochastic threshold arrays from said optimized stochastic patterns generated by said stochastic pattern generator.

25. The stochastic threshold array generating subsystem of claim 24 in which said stochastic pattern generator comprises:
  A. an initial stochastic pattern generator for generating initial stochastic patterns, a first initial stochastic pattern for a first iteration comprising said seed stochastic pattern, and at least one of said initial stochastic patterns for use in generating said optimized stochastic patterns after a first optimized stochastic pattern including said seed stochastic pattern surrounded by copies of at least one of said optimized stochastic patterns generated during a previous iteration; and
  B. a stochastic pattern optimizer for receiving said initial stochastic patterns and processing said initial stochastic patterns to generate respective said optimized stochastic patterns.

26. The stochastic threshold array generating subsystem of claim 25 in which said stochastic pattern optimizer comprises:
  A. a first error map generator for generating a first error map reflecting differences between said initial stochastic patterns provided thereto and processing performed by the rendering device in rendering an image defined by said optimized stochastic patterns and psychovisual processing as performed by an observer in viewing the image;
  B. stochastic pattern update generator for generating updated said optimized stochastic patterns in relation to said first error map;
  C. an iteration control for controlling said first error map generator and said stochastic pattern update generator through a series of iterations to generate said optimized stochastic patterns, wherein in said first iteration said iteration control enables said first error map generator to operate in connection with said initial stochastic patterns and in subsequent iterations said iteration control enables said first error map generator to operate in connection with said updated optimized stochastic patterns.

27. The stochastic threshold array generating subsystem of claim 26 in which each said stochastic pattern comprises pixels represented by two complementary colors, said stochastic pattern update generator updating said optimized stochastic patterns by alternating colors of selected numbers of pixels of each color to respective complementary colors, a number being selected for each iteration by the iteration control, the iteration control reducing the number for successive iterations.

28. The stochastic threshold array generating subsystem of claim 26 in which each said optimized stochastic pattern comprises a plurality of pixels, and in which said error map generator comprises:
  A. a rendering device model error map generator for generating a rendering device error map which minimizes grain by identifying errors in connection with processing by the rendering device of said image represented by each said stochastic pattern provided thereto in connection with rendering of large clusters of pixels;
  B. a neighborhood error map generator for generating a neighborhood error map which minimizes mottle by identifying errors in connection with processing by the rendering device of said image represented by said optimized stochastic pattern provided thereto in connection with rendering of small clusters of pixels; and
  C. a composite error map generator for generating a composite error map which provides a grain/mottle tradeoff in response to both said rendering device error map and said neighborhood error map.

29. The stochastic threshold array generating subsystem of claim 28 in which the rendering device error map generator includes:
  A. a rendering device filter for performing a rendering device filtering operation in connection with said stochastic patterns provided to said first error map generator to generate a rendering device filtered stochastic pattern, said rendering device filtered stochastic pattern reflecting processing performed by the rendering device in rendering said large clusters of pixels;
  B. a contrast sensitivity filter for performing a contrast sensitivity filtering operation in connection with said rendering device filtered stochastic pattern to generate a contrast sensitivity filtered stochastic pattern reflecting the psychovisual processing performed by the observer in connection with observing said rendering device filtered stochastic pattern; and
  C. a second error map generator for generating rendering device error map identifying differences between said stochastic patterns provided to said first error map generator and said contrast sensitivity filtered stochastic pattern in connection with said large clusters of pixels.

30. The stochastic threshold array generating subsystem of claim 29 in which, during processing of said initial stochastic patterns and updated stochastic patterns while generating said first optimized stochastic pattern, said rendering device filter performs the rendering device filtering operation and said contrast sensitivity filter performs the contrast sensitivity filtering operation both in accordance with a circular convolution filtering methodology.

31. The stochastic threshold array generating subsystem of claim 28 in which said composite error map generator includes:
  A. a neighborhood filter for performing a neighborhood filtering operation in connection with said stochastic patterns provided to said second error map generator to generate a neighborhood filtered stochastic pattern reflecting processing performed by the rendering device in rendering said small clusters of pixels;
  B. a third error map generator for generating the neighborhood error map identifying differences between said stochastic patterns as provided to said second error map generator and said neighborhood filtered stochastic pattern in connection with said small clusters of pixels.

32. The stochastic threshold array generating subsystem of claim 31 in which, during processing of said initial stochastic patterns and updated stochastic patterns while generating said first optimized stochastic pattern, said neighborhood filter performs the neighborhood filtering operation in accordance with a circular convolution filtering methodology.

33. The stochastic threshold array generating subsystem of claim 31 in which said third error map generator generates said neighborhood error map from said optimized stochastic patterns using a filter in which each pixel is generated according to the form of a constant value minus a predetermined Gaussian function having a parameter that varies the filtered cluster size.

34. The stochastic threshold array generating subsystem of claim 33 in which said third error map generator generates said neighborhood error map from said optimized stochastic patterns using a filter applied to each pixel of said optimized stochastic patterns of the form $$k\left[\delta(x-x_0,y-y_0)-e-\left(\frac{(x-x_0)^2}{2\sigma^2}\right)e-\left(\frac{(y-y_0)^2}{2\sigma^2}\right)\right],$$

where "x" and "y" are horizontal and vertical axes, respectively, of the stochastic pattern, "x0" and "y0" are coordinates along the respective "x" and "y" axes of the pixel being filtered, "k" and "F" are constants having selected values, with F being variable to vary the filtered cluster size, and "δ" is a delta function corresponding to the value "1" where (x,y)=(x0,y0) and zero elsewhere.

35. The stochastic threshold array generating subsystem of claim 28 in which said composite error map generator includes:
   A. weighted error generating means for generating a weighted rendering device error map from said rendering device error map and a weighted neighborhood error map from said neighborhood error map both in response to a weighting value; and
   B. a combiner for generating said combined error map from said weighted rendering device error map and said weighted neighborhood error map.

36. The stochastic threshold array generating subsystem of claim 35 in which said weighting value is selected by an operator.

37. A stochastic threshold array generating subsystem for generating a plurality of stochastic threshold arrays for use in connection with generation of output image data from continuous tone image data for rendering by a rendering device, said stochastic threshold array generating subsystem comprising:
   A. an optimized stochastic pattern generator for generating an optimized stochastic pattern from a seed stochastic pattern comprising:
      i. an initial stochastic pattern generator for generating an initial stochastic pattern; and
      ii. a stochastic pattern optimizer for optimizing the initial stochastic pattern comprising:
         a. an error map generator for generating an error map reflecting differences between a stochastic pattern provided thereto and a rendering device filtered stochastic pattern that represents processing performed by the rendering device in rendering an image followed by psychovisual processing as performed by an observer in viewing the image and a neighborhood filtered stochastic pattern which identifies and penalizes features associated with mottle, respective contributions of the rendering device filtered stochastic pattern and the neighborhood filtered stochastic pattern to the error map being determined by respective complementary weighting factors, differing weighting factors being used during optimizing for the stochastic threshold arrays thereby to provide differing grain/mottle tradeoff conditions;
         b. an updated stochastic pattern generator for generating an updated stochastic pattern in relation to the error map generated during the iteration; and
         c. an iteration control for controlling the error map generator and the updated stochastic pattern generator through a series of iterations, the iteration control enabling the error map generator to use the updated stochastic pattern generated during an iteration as the stochastic pattern used in generating the error map during a subsequent iteration;
   B. generating the stochastic threshold arrays from the optimized stochastic patterns.

38. The stochastic threshold array generating subsystem of claim 37 in which each stochastic pattern comprises a plurality of pixels, and in which the error map generator comprises:
   A. a rendering device error map generator generating a rendering device error map which minimizes grain by identifying errors in connection with processing by the rendering device of an image represented by the stochastic pattern provided thereto in connection with rendering of large clusters of pixels;
   B. a neighborhood error map generator for generating a neighborhood error map which minimizes mottle by identifying errors in connection with processing by the rendering device of an image represented by the stochastic pattern provided thereto in connection with rendering of small clusters of pixels; and
   C. a composite error map generator for generating a composite error map which provides a grain/mottle tradeoff in response to both the rendering device error map and the neighborhood error map using the complementary weighting values to determine respective contributions of the rendering device error map and the neighborhood error map to the composite error map.

39. The stochastic threshold array generating subsystem of claim 38 in which the rendering device error map generator comprises:
   A. a rendering device filter for performing a rendering device filtering operation in connection with the stochastic pattern to generate a rendering device filtered stochastic pattern, the rendering device filtered stochastic pattern reflecting processing performed by the rendering device in rendering large clusters of pixels comprising the stochastic pattern;
   B. a contrast sensitivity filter for performing a contrast sensitivity filtering operation in connection with the rendering device filtered stochastic pattern to generate a contrast sensitivity filtered stochastic pattern, the contrast sensitivity filtered stochastic pattern reflecting the psychovisual processing performed by the observer in connection with the observing the rendering device filtered stochastic pattern; and
   C. a composite rendering device error map generator for generating the rendering device error map identifying differences between the stochastic pattern and the contrast sensitivity filtered stochastic pattern in connection with large clusters of pixels.

40. The stochastic threshold array generating subsystem of claim 39 which, during processing of the initial stochastic pattern and updated stochastic patterns while generating the first optimized stochastic pattern, the rendering device filtering operation and the contrast sensitivity filtering operation are both performed in accordance with a circular convolution filtering methodology.

41. The stochastic threshold array generating subsystem of claim 38 in which the neighborhood error map generator comprises:
   A. a neighborhood filter for performing a neighborhood filtering operation in connection with the stochastic pattern to generate a neighborhood filtered stochastic pattern, the neighborhood filtered stochastic pattern reflecting processing performed by the rendering device in rendering small clusters of pixels comprising the stochastic pattern; and
   B. an error map generator for generating the neighborhood error map identifying differences between the stochastic pattern and the neighborhood filtered stochastic pattern in connection with small clusters of pixels.

42. The stochastic threshold array generating subsystem of claim 41 in which the neighborhood filter performs the neighborhood filtering operation in accordance with a circular convolution filtering methodology during processing of the initial stochastic pattern and updated stochastic patterns while generating the first optimized stochastic pattern.

43. The stochastic threshold array generating subsystem of claim 41 in which the neighborhood filter performs the neighborhood filtering operation using a filter in which each pixel is generated according to the form of a constant value minus a predetermined Gaussian function, the predetermined Gaussian function having an parameter that may be varied to vary the filtered cluster size.

44. The stochastic threshold array generating subsystem of claim 43 in which the neighborhood filter performs the neighborhood filtering operation using a filter applied to each pixel of the stochastic pattern of the form $$k\left[\delta(x-x_0, y-y_0) - e-\left(\frac{(x-x_0)^2}{2\sigma^2}\right)e-\left(\frac{(y-y_0)^2}{2\sigma^2}\right)\right],$$

where "x" and "y" are horizontal and vertical axes, respectively, of the stochastic pattern, "x0" and "y0" are coordinates along the respective "x" and "y" axes of the pixel being filtered, "k" and "F" are constants having selected values, with F being variable to vary the filtered cluster size, and "$\delta$" is a delta function corresponding to the value "1" where (x,y)=(x0,y0) and zero elsewhere.

45. An error map generator for generating an error map for use in generating updated stochastic patterns in connection with a stochastic pattern provided to the error map generator, the stochastic pattern to be used in connection with generation of a stochastic threshold array to be used in generating output image data from continuous-tone image data to be rendered by a rendering device, each stochastic pattern comprising a plurality of pixels, the error map generator comprising:
   A. means for generating a rendering device error map which minimizes grain by identifying errors in connection with processing by the rendering device of an image represented by the stochastic pattern provided thereto in connection with rendering of large clusters of pixels;
   B. a neighborhood error map generator for generating a neighborhood error map which minimizes mottle by identifying errors in connection with processing by the rendering device of said image represented by the stochastic pattern provided thereto in connection with rendering of small clusters of pixels; and
   C. a composite error map generator for generating a composite error map which provides a grain/mottle tradeoff in response to both the rendering device error map and the neighborhood error map.

46. The error map generator of claim 45 in which said generating means comprises:
   A. a rendering device filter for performing a rendering device filtering operation in connection with the stochastic pattern provided to the error map generator to generate a rendering device filtered stochastic pattern reflecting processing performed by the rendering device in rendering said large clusters of pixels;
   B. a contrast sensitivity filter for performing a contrast sensitivity filtering operation in connection with the rendering device filtered stochastic pattern to generate a contrast sensitivity filtered stochastic pattern reflecting psychovisual processing performed by an observer in connection with observing the rendering device filtered stochastic pattern; and
   C. a first generator for generating the rendering device error map by identifying differences between the stochastic pattern as provided to the error map generator and the contrast sensitivity filtered stochastic pattern in connection with said large clusters of pixels.

47. The error map generator of claim 45 in which the composite error map generator includes:
   A. a neighborhood filter for performing a neighborhood filtering operation in connection with the stochastic pattern provided to the error map generator to generate a neighborhood filtered stochastic pattern reflecting processing performed by the rendering device in rendering said small clusters of pixels;
   B. a second generator for generating the neighborhood error map by identifying differences between the stochastic pattern as provided to the error map generator and the neighborhood filtered stochastic pattern in connection with said small clusters of pixels.

48. The error map generator of claim 47 in which the neighborhood filter performs the neighborhood filtering operation using a filter in which each pixel is generated according to the form of a constant value minus a predetermined Gaussian function having a parameter that varies the filtered cluster size.

49. The error map generator of claim 48 in which the neighborhood filter performs the neighborhood filtering operation using a filter applied to each pixel of the stochastic pattern of the form $$k\left[\delta(x-x_0, y-y_0) - e-\left(\frac{(x-x_0)^2}{2\sigma^2}\right)e-\left(\frac{(y-y_0)^2}{2\sigma^2}\right)\right],$$

where "x" and "y" are horizontal and vertical axes, respectively, of the stochastic pattern, "x0" and "y0" are coordinates along the respective "x" and "y" axes of the pixel being filtered, "k" and "F" are constants having selected values, with F being variable to vary the filtered cluster size, and "$\delta$" is a delta function corresponding to the value "1" where (x,y)=(x0,y0) and zero elsewhere.

50. The error map generator of claim 45 in which the composite error map generator includes:
   A. weighted error generating means for generating a weighted rendering device error map from the rendering device error map and a weighted neighborhood error map from the neighborhood error map both from a weighting value; and B. a combiner for generating said combined error map from the weighted rendering device error map and the weighted neighborhood error map.

51. The error map generator of claim 50 in which the weighting value is selected by an operator.

52. A method of generating an error map for use in generating updated stochastic patterns to be used in connection with generation of a stochastic threshold array to be used in generating output image data from continuous-tone image data to be rendered by a rendering device, each stochastic pattern comprising a plurality of pixels, the method comprising the steps of:

A. generating a rendering device error map which minimizes grain by identifying errors in connection with processing by the rendering device of an image represented by the stochastic pattern provided thereto in connection with rendering of large clusters of pixels;

B. generating a neighborhood error map which minimizes mottle by identifying errors in connection with processing by the rendering device of said image represented by the stochastic pattern provided thereto in connection with rendering of small clusters of pixels; and C. generating a composite error map which provides a grain/mottle tradeoff in response to both the rendering device error map and the neighborhood error map.

53. The method of claim 52 in which the rendering device error map generating step includes the steps of:

A. performing a rendering device filtering operation in connection with the stochastic pattern to generate a rendering device filtered stochastic pattern reflecting processing performed by the rendering device in rendering said large clusters of pixels;

B. performing a contrast sensitivity filtering operation in connection with the rendering device filtered stochastic pattern to generate a contrast sensitivity filtered stochastic pattern reflecting psychovisual processing performed by an observer in connection with observing the rendering device filtered stochastic pattern; and C. generating said rendering device error map by identifying differences between the stochastic pattern and contrast sensitivity filtered stochastic pattern in connection with said large clusters of pixels.

54. The method of claim 53 in which the composite error map generation step includes the steps of:

A. performing a neighborhood filtering operation in connection with generating a neighborhood filtered stochastic pattern, said neighborhood filtered stochastic pattern reflecting processing performed by the rendering device in rendering said small clusters of pixels;

B. generating the neighborhood error map identifying differences between the stochastic pattern as provided to the error map generator and the neighborhood filtered stochastic pattern in connection with small clusters of pixels.

55. The method of claim 54 in which the neighborhood filtering operation is performed using a filter in which each pixel is generated according to the form of a constant value minus a predetermined Gaussian function having a parameter that varies the filtered cluster size.

56. The method of claim 55 in which the neighborhood filtering operation is performed using a filter applied to each pixel of the stochastic pattern of the form $$k\left[ \delta(x-x_0, y-y_0) - e - \left( \frac{(x-x_0)^2}{2\sigma^2} \right) e - \left( \frac{(y-y_0)^2}{2\sigma^2} \right) \right],$$

where "x" and "y" are horizontal and vertical axes, respectively, of the stochastic pattern, "x0" and "y0" are coordinates along the respective "x" and "y" axes of the pixel being filtered, "k" and "F" are constants having selected values, with F being variable to vary the filtered cluster size, and "δ" is a delta function corresponding to the value "1" where (x,y)=(x0,y0) and zero elsewhere.

57. The method of claim 52 in which the composite error map generation step includes the steps of:

A. generating, in response to a weighting value, both a weighted rendering device error map from the rendering device error map and a weighted neighborhood error map from the neighborhood error map; and B. generating said combined error map from both said weighted rendering device error map and said weighted neighborhood error map.

58. The method of claim 57 in which the weighting value is selected by an operator.

59. A method of generating discrete tone image data from continuous-tone image data for rendering by a rendering device, comprising the steps of:

A. providing a plurality of stochastic threshold arrays generated from individually generated stochastic patterns, each stochastic pattern that is used in an image being optimized to reflect processing performed by the rendering device in rendering said image defined by the stochastic pattern, and being optimized by psychovisual processing performed by an observer in observing the image, and further being optimized so that said stochastic patterns, when tiled together, have optimal visual tiling characteristics proximate to respective edges; and B. processing the continuous tone image data in relation to ones of said stochastic threshold arrays randomly selected and tiled over the continuous-tone image data, the discrete tone image data being generated from correspondingly positioned pixels of the continuous-tone image data and threshold values of the tiled stochastic threshold arrays.

60. A method of generating discrete tone image data from continuous-tone image data for rendering by a rendering device, comprising the steps of:

A. providing a plurality of stochastic threshold arrays generated from individually generated stochastic patterns, each stochastic pattern being optimized to reflect corresponding predetermined grain/mottle trade-off conditions and further being optimized so that each pattern, any of which corresponds to a tone from a stochastic threshold array, when tiled with itself has an optimal visual tiling characteristic proximate respective edges; and B. processing the continuous tone image data in relation to the stochastic threshold arrays by retrieving the stochastic threshold array for one of the predetermined grain/mottle trade-off conditions, as selected by an operator, from a stochastic threshold array library, tiling the retrieved stochastic threshold array over the continuous-tone image data and generating the discrete tone image data from correspondingly positioned pixels of the continuous-tone image data and threshold values of the tiled stochastic threshold array.

61. A method of generating a plurality of stochastic threshold arrays for use in connection with generation of output image data from continuous tone image data for rendering by a rendering device, comprising the steps of:

A. generating a plurality of optimized stochastic patterns each from a respective seed stochastic pattern, at least one of the optimized stochastic patterns being generated from said respective seed stochastic pattern and a previously-generated optimized stochastic pattern to thereby provide that the optimized stochastic pattern so generated, when tiled with others of the optimized stochastic patterns, will have optimal visual tiling characteristics proximate their respective edges; and B. generating the stochastic threshold arrays from the optimized stochastic patterns.

62. A stochastic threshold array library comprising a plurality of stochastic threshold arrays for use in connection with generation of output image data from continuous tone image data for rendering by a rendering device, the stochastic threshold array library being generated in accordance with the steps of:

A. generating a plurality of optimized stochastic patterns each from a respective seed stochastic pattern, at least some of the optimized stochastic patterns each being generated from a said respective seed stochastic pattern and a previously-generated optimized stochastic pattern to thereby provide that the optimized stochastic pattern so generated, when tiled with others of the optimized stochastic patterns, will have optimal visual tiling characteristics proximate their respective edges; and B. generating the stochastic threshold arrays from the optimized stochastic patterns.

63. A discrete tone image generated from continuous-tone image data in accordance with the method comprising the steps of:

A. processing the continuous tone image data in relation to randomly selected stochastic threshold arrays, the randomly selected stochastic threshold arrays being generated from individually-generated stochastic patterns, each stochastic pattern being optimized to reflect processing performed by a selected rendering device in rendering an image defined by the stochastic pattern and psychovisual processing performed by an observer in observing the image, and further being optimized so that the stochastic patterns, when tiled together, have optimal visual tiling characteristics proximate their respective edges, the stochastic threshold arrays being randomly tiled over the continuous-tone image data and the discrete tone image data being generated from correspondingly positioned pixels of the continuous-tone image data and threshold values of the tiled stochastic threshold arrays; and B. rendering the output image data using the rendering device.

64. A discrete tone image generated from continuous-tone image data in accordance with the method comprising the steps of:

A. processing the continuous tone image data in relation to randomly selected stochastic threshold arrays generated from individually generated stochastic patterns, each stochastic pattern being optimized to reflect corresponding predetermined grain/mottle trade-off conditions and further being optimized so that when tiled each said stochastic pattern, corresponding to a tone from one of said stochastic threshold arrays, has an optimal visual tiling characteristic proximate respective edges, said stochastic threshold arrays being randomly tiled over the continuous-tone image data, discrete tone image data being generated in response to both correspondingly positioned pixels of the continuous-tone image data and threshold values of the tiled stochastic threshold arrays; and B. rendering the discrete tone image from said discrete tone image data.

* * * * *